US006307962B1

(12) United States Patent
Parker et al.

(10) Patent No.: US 6,307,962 B1
(45) Date of Patent: Oct. 23, 2001

(54) DOCUMENT DATA COMPRESSION SYSTEM WHICH AUTOMATICALLY SEGMENTS DOCUMENTS AND GENERATES COMPRESSED SMART DOCUMENTS THEREFROM

(75) Inventors: Kevin J. Parker; Hei Tao Fung, both of Rochester, NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 08/966,143

(22) Filed: Nov. 7, 1997

Related U.S. Application Data

(63) Continuation of application No. 08/522,776, filed on Sep. 1, 1995, now abandoned.

(51) Int. Cl.[7] .................................................. G06K 9/00
(52) U.S. Cl. .......................... 382/170; 382/224; 382/237
(58) Field of Search .................................... 382/164, 165, 382/166, 170, 171, 172, 173, 180, 239, 228, 237, 250, 251, 205, 224; 358/539, 534, 467, 462; 348/403, 397

(56) References Cited

U.S. PATENT DOCUMENTS

| 4,741,046 | * | 4/1988 | Matsunawa et al. | 382/176 |
| 5,073,953 | | 12/1991 | Westdijk | 382/176 |

(List continued on next page.)

OTHER PUBLICATIONS

Chein et al., "A novel segmentation and processing for Chinese–English document," SPIE, vol. 1606, pp. 558–598 (1991).

Chein et al., "A novel block segmenation and classification algorithum in mixed text/graphic/image/table documents," SPIE, vol. 1153, pp. 621–631 (1989).

Yoshida et al., "Bi–level Rendition of Images Containing Text, Screened Halftone and Continous Tone," Globecom '91, pp. 104–109 (1991).

(List continued on next page.)

Primary Examiner—Timothy M. Johnson
(74) Attorney, Agent, or Firm—Kenneth J. LuKacher

(57) ABSTRACT

Data representing a compressed document, referred to as a smart document, is produced from a document page composed of an array of pixel signals having values representative of gray scale. The system initially subdivides the pixel signals of the document page into a matrix of blocks, and classifies blocks as active or non-active. The document page is segmented into macroblocks (segments) by grouping one or more adjacent active blocks. One or more regions of adjacent non-active blocks are then located and the prevalent value of pixel signals in each region is determined to provide background data. The macroblocks are classified as first or second macroblock types based upon the values of the pixel signals in each macroblock. A bit-map is produced representing the blocks in the matrix of the first macroblock type. The pixel signals in the blocks represented in the map are thresholded into a binary representation to provide a binary image. Data signals representing the majority and minority gray scale levels of each first type macroblock are determined. Position data is generated specifying the locations of the macroblocks in the matrix of the second macroblock type. Map, binary image, and pixel signals from the second type macroblocks are then encoded into corresponding data. The smart document is generated from the encoded data, the background data, the position data, and data signals representing the gray scale levels of each macroblock of the first type. A reproduction of the document page can be rendered from the smart document.

44 Claims, 10 Drawing Sheets

U.S. PATENT DOCUMENTS

| | | | | |
|---|---|---|---|---|
| 5,086,480 | * | 2/1992 | Sexton et al. | 382/171 |
| 5,235,650 | * | 8/1993 | Jeong | 382/205 |
| 5,327,262 | | 7/1994 | Williams | 358/462 |
| 5,335,290 | | 8/1994 | Cullen et al. | 382/176 |
| 5,339,172 | * | 8/1994 | Robinson | 358/467 |
| 5,341,226 | | 8/1994 | Shiau | 382/164 |
| 5,379,130 | | 1/1995 | Wang et al. | 382/176 |
| 5,392,362 | * | 2/1995 | Kimura et al. | 382/176 |
| 5,416,603 | * | 5/1995 | Suzuki et al. | 358/426 |
| 5,424,778 | * | 6/1995 | Sugiyama et al. | 348/403 |
| 5,444,552 | * | 8/1995 | Smith III | 358/465 |
| 5,568,571 | * | 10/1996 | Willis et al. | 382/176 |
| 5,577,131 | * | 11/1996 | Oddou | 382/173 |

OTHER PUBLICATIONS

Chen et al., "A Binary Representation of Mixed Documents (Text/Graphic/Image) That Compresses," ICASSP 86, pp. 537–540 (1986).

Wahl et al., "Block Segmentation and Text Extraction in Mixed Text/Image Documents," Computer Graphics and Image Processing vol. 20, pp. 375–390 (1982).

Pavlidis et al., "Page Segmentation and Classification," CVGIP: Graphic Models and Image Processing, vol. 54, No. 6, pp. 484–496 (Nov. 1992).

Chauvet et al., "System for an intelligent office document analysis, recognition and description," Signal Processing, vol. 32, pp. 161–190 (1993).

Bones et al., "Segmentation of document images," SPIE, vol. 1258, pp. 78–88 (1990).

Ohuchi et al., "A Segmentation Methjod for Composite Text/Graphics (Halftone and Continous Tone Photographs) Documents," Systems and Computers in Japan, vol. 24, No. 2, pp. 35–44 (1993).

Wang et al., "Classification of Newspaper Image Blocks Using Texture Analysis," Computer Vision, Graphics, and Image Processing, vol. 47, pp. 327–352 (1989).

Parker et al., "Efficient fax transmission of halftone images," Journal of Electronic Imaging, vol. 1, No. 2, pp. 203–208 (Apr. 1992).

Nagy et al., "Document analysis with an expert system," Proc. Pattern Recog. in Practice, Amsterdam, Jun. 19–21, 1985, vol. II.

CCITT, "Recommendation T. 4, Standardization of Group 3 facsimile apparatus for document transmission," vol. VII–Frascicle VII. 3, 21–47.

Knorz, Gerhard E., "Automated Input into Database: OCR and Descriptive Cataloguing", Bringing Down The Barriers To Information Transfer, pp. 7/1–10 91992).

McLaren et al., "Removal of subjective redundancy from DCT–coded images," IEEE Proceedings–I, vol. 138, No. 5 (Oct. 1991).

Rosenberg, Sue, "Corel Draw Shows Great Promise, "BYTE, pp. 213–216 (Jun 1989).

CCITT Draft Recommendation T.82 ISO/IEC Draft International Standerd 11544, WG9–S1R5.1 "Coded representation of picture and audio information —progressive bi–level image compression," Apr. 3, 1992.

Adobe Systems, Inc., Postcript Language: Tutorial and Cookbook, Edison–Wesley (1987).

F. Keissarian et al., "Image Coding and image activity measurement," Proc. of SPIE, vol. 2055, pp. 335–342 (1993).

Digital Compression and Coding of Continous–tone images, Part I, Requirements and Guidelines. ISO/IEC JTC1 Draft International Standard 10918–1 (Nov. 1991).

G.F. McLean et al., "Computers and visual database: designing open systems for flexible image cataloguing, " Educational Multimedia and Hypermedia and Hypermedia Annual, 1993. Proceedings of ED–MEDIA 93 –World Conference in Education Multimedia and Hypermedia, pp. 359–366 (1993).

Ohta et al., "Color Infromation For Region Segmentation, "Computer Graphics and Image Processing, vol. 13, pp. 222–241 (1980).

S. Forchhammert and M. Forchhammer, Algorithm For Coding Scanned Halftone Images (1988).

CCITT,"Reconsideration T.6 Facsimile coding control functions for Group 4 facsimile apparatus," vol. VII Fascicle VII. 3, 40–48.

A.N. Netravali and B.G. Haskell, Digital Pictures Prepresentation and Compression, pp. 380–418, (1988).

Keissarian et al., Image coding and Image activity measurement, 1993, pp. 335–342.*

Ohta et al., Color information for region segmentation, 1980, pp.223–240.*

Bones et al., Segmentation of document images, 1990, pp.78–88.*

Chein et al., A novel block segmentation and processimg for Chinese–English document, 1991, pp. 588–598.*

* cited by examiner

DOCUMENT DATA COMPRESSION SYSTEM WHICH AUTOMATICALLY SEGMENTS DOCUMENTS AND GENERATES COMPRESSED SMART DOCUMENTS THEREFROM

This application is a continuation, of application Ser. No. 08/522,776 filed Sep. 1, 1995, now abandoned.

FIELD OF INVENTION

The present invention relates to a system (method and apparatus) for document data compression, and particularly, to a system for document data compression which automatically segments a document into segments, classifies these segments as different types of image information, and then compresses the document based upon the segment classification to generate a compressed document (referred to herein as a smart document since the compressed data generally reflects knowledge of the character of the image on the document). The system is further capable of rendering a reproduction of the document from data representing the smart document.

BACKGROUND AND ADVANTAGES OF THE INVENTION

Digital documents are generated every time a printed page or film is received by a facsimile machine, scanner, digital photocopier, or other similar digital input devices. These digital documents are composed of an array of pixels with values representing gray scale. Generally, these digital documents contain different types of image information, such as text having different background and foreground gray scale values, continuous tone images, graphics, and halftone images, which may be mixed on a document page.

Conventional facsimile machines operate on the data of digital documents to provide a representation of the document suitable for transmission and subsequent rendition by a receiving facsimile machine. These operations are often referred to as rendition methods including, for example, ordered dithering, error diffusion, and binarization (bi-level quantization). By applying these rendition methods a bit map representation of the document is formed. Typically, facsimile machines operate on digital documents by applying a single rendition method for the entire image. This fails to adequately reproduce documents having mixed types of image information because not all image types can properly be reproduced by the same rendition method. For example, binarizing may be proper for text images, but when applied to continuous tone images, gray scale transitions of the image are lost. Further, applying ordered dithering or error diffusion can halftone a continuous tone image, but applying such methods to text images causes the edge of text to blur, which sometimes results in text being illegible. Thus, applying an improper rendition method to different image components of a document produces distortions which degrade reproduction quality.

In addition, facsimile machines may compress and decompress a rendered bit map representation of documents by Group 3 or Group 4 standards. Examples of Group 3 and Group 4 standards are described in: CCITT, "Recommendation T.4, Standardization of Group 3 facsimile apparatus for document transmission," Vol. VII-Fascicle VII.3, 21–47; and, CCITT, "Recommendation T.6, Facsimile coding schemes and coding control functions for Group 4 facsimile apparatus," Vol. VII-Fascicle VII.3, 48–57. However, although data compression may be performed, poor reproduction of mixed image type document is maintained.

To improve reproduction quality, digital documents can be segmented into their image components. The resulting segments can then be classified as to image type, and different rendition methods applied to segments based on their type. Many of the proposals for segmenting a document heretofore presented are oriented towards analyzing different information in a mixed document, such as for optical character recognition (OCR) purposes.

These approaches include such methods as recursive X-Y cut (RXYC), and constrained run-length algorithm (CRLA), which is also referred to as run length smoothing algorithm (RLSA). The following literature describes RXYC: G. Nagy, S. Seth, and S. D. Stoddard, "Document analysis with an expert system," Proc. Pattern Recog. in Practice, Amsterdam, Jun. 19–21, 1985, Vol. II; and, P. J. Bones, T. C. Griffin, C. M. Carey-Smith, "Segmentation of document images," *SPIE Vol* 1258 *Image Communications and Workstations*, 78–88, 1990. CRLA is described in: F. M. Wail, K. Y. Wong, and R. G. Casey, "Block segmentation and text extraction in mixed text/image documents," *Comput. Vision Graphics Image Process.*, vol. 20, 375–390, 1982; B. S. Chien, B. S. Jeng, S. W. Sun, G. H. Chang, K. H. Shyu, and C. S. Shih, "A novel block segmentation and processing for Chinese-English document," *SPIE Vol.* 1606 *Visual Communications and Image Processing '91: Image Processing*, 588–598, 1991; T. Pavlidis and J. Zhou, "Page segmentation and classification," *CVGIP: Graphical Models and Image Processing*, Vol. 54, No. 6, November 484–496, 1992; P. Chauvet, J. Lopez-Krahe, E. Taflin, and H. Maitre, "System for an intelligent office document analysis, recognition and description," *Signal Processing*, Vol. 32, 161–190, 1993.

RXYC and CRLA both assume an alignment of digital documents and rectangular sized segments. Accordingly, these methods have strong directional preferences, and require processing to correct improper document segmentation due to non-rectangular segments and skewing of segments from the assumed alignment. Moreover, tilting of image components for their assumed alignment in the document may result in segments having mixed image types. It would therefore be desirable to perform document segmentation which is not subject to the above limitation of document alignment or rectangular shaped segments.

Several other segmenting proposals have been oriented towards document rendition, such as performed in facsimile machines, rather than document analysis. Examples of these segmentation proposals are contained in the following publications: Y. Chen, F. C. Mintzer, and K. S. Pennington, "A binary representation of mixed documents (text/graphic/image) that compresses," ICASSP 86, 537–540, 1986; M. Yoshida, T. Takahashi, T. Semasa, and F. Ono, "Bi-level rendition of images containing text, screened halftone and continuous tone," *Globecom* '91, 104–109, 1991; and, S. Ohuchi, K. Imao, and W. Yamada, "A segmentation method for composite text/graphics (halftone and continuous tone photographs) documents," *Systems and Computers in Japan*, Vol. 24, No. 2, and 35–44, 1993.

In Ohuchi et al., a digital document is first subdivided into non-overlapping 4×4 pixel blocks. A block is considered a halftone block if gray level peaks appear in pixels of blocks neighboring the block. A first mask is created for the document by combining the halftone blocks to detect halftone areas. A second mask is then generated by quantizing the pixels of the document into three levels, detecting continuous black and white pixels by pattern matching of a 5×5 pixel block, and activating the block as an edge area once a desired pattern is detected. The two masks determine the classification of pixels. Text areas of the document are based on edge areas of the second mask and the non-halftone areas of the first mask. All areas which are not text are considered graphics. Graphics are halftoned by dithering or error diffusion, are then the document is binarized.

In Chen et al., a digital document is first subdivided into non-overlapping 4×4 pixel blocks. Each block is classified as text or image as follows: Two sets of four pixels are selected of a block. If any of the four pixels in each set has a gray level valve above a white threshold, the block is text. If two selected pixels from each set are below a black threshold, the block is also text. Blocks not classified as text are classified as image. Runs of horizontal image blocks shorter than 12 blocks are reclassified as text blocks. Pixels in text blocks are binarized into a first bit map, and pixels in image blocks are halftoned by error diffusion.

Further, in Yoshida et al., a digital document is segmented by first classifying each pixel as a screened or unscreened halftone pixel. The middle pixel of a 5×3 pixel block is classified by binarizing the pixels in the block based upon a threshold value of the average of the central 3×3 pixels, counting the number of transitions in both horizontal and vertical directions and then comparing the number of transitions in both directions to corresponding thresholds. If the number of transitions in each direction is greater than the threshold, the pixel is a screened halftone, otherwise it is a non-screened halftone. Classification errors are then removed by setting the middle pixel as a non-screened halftone if it is part of the image background, and by matching the 5×3 block to pixel patterns and setting the middle pixel accordingly if a pattern match occurs. Non-screened halftone pixels are classified as text or continuous tone by comparing attributes of the block including, maximum gray value, minimum gray value and the difference between the maximum and minimum, against three corresponding thresholds. If any attribute exceeds such thresholds, the pixel is text, otherwise the pixel is continuous tone. Screened halftone, text, and continuous tone document areas are detected using the pixel classifications. Next, the document is rendered using error diffusion with an error feedback loop, ordered dither merging, and deletion of screened frequencies, which are controlled by parameters based upon the segmentation results.

The three above described segmentation proposals have several drawbacks. First, these proposals tend to generate segments with mixed image types, such as including pixels of a continuous tone image in a text classified segments. This results in poor reproduction since a single rendition method will be applied to such a mixed segment just as when a single rendition method is applied to an entire mixed document For example, halftoning of text, in an otherwise continuous tone segment, will results in poor text quality in the reproduced document. Second, these proposals result in a bit map representation of the document by halftoning continuous tone images and binarizing text images. However, halftoning continuous tone image does not adequately represent the underlying gray scale transitions due to the excessive loss of information by converting pixel gray scale value to black and white dots of a halftone image.

In addition to the above problems, the above proposals do not accurately reproduce the shades of text images in a document. Text images possess pixels occupying predominately two gray scale levels, which represent the shade of the background and text foreground. Generally, the above three proposals, as well as facsimile machines, assume that text is always a darker shade than its background Yoshida et al, even assumes a particular range of gray levels possible for text. This fails to account for text images in which the text may be lighter than its background. Furthermore, different text image regions of a document may have different sets of background and foreground levels.

As the description proceeds the following definitions are used: "primitive document" and "document page" both refer to a digital document composed of an array of pixels having values representing the gray scale; and "smart document" refers to the document generated in accordance with this invention from a primitive document.

An advantage of the present invention is that it substantially obviates the drawbacks of the prior art for document compression and provides a system especially adapted for use in a document transmission and rendition system, such as a facsimile machine. This system provides high quality document reproduction by efficiently segmenting primitive documents without accounting for document alignment or rectangular segment shape. The system further accurately classifies primitive document segments for subsequent data compression based on segment classification, and produces smart documents with data compression at ratios equalling or exceeding those obtained with known prior art document compression techniques. This compression is achieved together with accurate reproduction documents described by data representing smart documents. Additionally, the smart documents are provided in accordance with the invention in an image data format which readily enables storage of documents. The storage format also facilitates processing of segments according to their image types. Such processing can facilitate (a) OCR (optical character recognition) of text segments, (b) image editing of gray scale segments, and (c) the conversion of documents into other representations prior to document printing.

SUMMARY OF THE INVENTION

Accordingly, it is an object of the present invention to provide an improved data compression system (method and apparatus) in which a primitive document is automatically segmented into segments of different image information types, such as binary and gray scale (non-binarizable) image types, and in which the drawbacks of prior segmentation proposals are substantially obviated.

It is also an object of the present invention to provide an improved data compression system which generates a smart document from a primitive document to provide enhanced ratios of data compression while achieving superior reproduction quality of a document represented by the smart document.

Another object of the present invention is to provide an improved data compression system which segments a primitive document in a manner mimicking human visual perception of document images.

A still further object of the invention is to provide an improved data compression system which is responsive to the two gray levels characterizing text images, and which accounts for text appearing lighter or darker than the background of the document.

Another object of the invention is to provide an improved data compression system which accurately characterizes the background gray scale levels of different regions of the primitive document.

A still further object of the present invention is to provide an improved system for data compression that may be implemented in facsimile systems operating upon either gray scale or color documents, and may be easily converted into other representations for particular printing applications.

It should be understood that the invention comprehends the attainment of one or more of the foregoing objects and/or other objects and features as will be apparent as this Description proceeds.

Briefly described, a system provided in accordance with a presently preferred embodiment of the invention produces a compressed document from a document page composed of an array of pixel signals having values representative of gray scale, such as provided by a digital scanner. This system can be computer based and may use a digital microprocessor which operates responsive to a set of programmed instructions. The system initially subdivides the pixel signals of the document page into a matrix of blocks. The document page is then segmented into macroblocks (segments), such that each macroblock is composed of a group of one or more adjacent blocks in the matrix. Next, one or more regions of adjacent blocks which are not part of the macroblocks are located and the prevalent value of the pixel signals of the blocks in each region is determined to provide background data. These macroblocks are classified as one of two image types based upon a statistical distribution of the values of the pixel signals of the blocks composing each macroblock. Next, a map (bit map) is produced representing the blocks in the matrix of a first of the macroblock image types. The pixel signals in the blocks represented in the map are then thresholded into a binary representation to provide a binary image. Data signals representing the levels of the majority and minority gray scale levels of each first type macroblock are obtained responsive to the pixel signals in the array. Position data are generated specifying the locations of the macroblocks in the matrix of a second of the macroblock image types. The compressed (smart) document is generated from the map, the binary image, the pixel signals for the macroblocks of the second type, the background data, and the position data. Further the map, binary image, and pixel signals in the second type of macroblocks may be encoded into corresponding data prior to generating of the compressed document. The above described first macroblock type is called a binary macroblock and the pixels contained therein are binarizable. The second macroblock type is called a gray scale macroblock and the pixels contained therein are non-binarizable.

Further in accordance with the invention, the above segmentation of the document page into macroblocks is provided when the system first classifies each block in the matrix as active or non-active in response to the values of the pixel signals in the block. One or more non-active blocks are then reclassified as active, in response to the activity classifications of blocks adjacent to each non-active block. Finally, the macroblocks are generated by grouping one or more adjacent active blocks.

In accordance with another aspect of this invention, a system is provided for automatic segmentation of a scanned document into separate document areas containing different types of image information. The system uses a scanner for scanning the document to generate a scanned image thereof. The system subdivides the scanned image into a matrix of blocks, and then analyzes the information contained in each block to classify the blocks as active or non-active, therein providing an activity classification of the blocks. Macroblocks are generated by grouping one or more adjacent blocks in the matrix responsive to their activity classification thereby segmenting said document. Finally, the information contained in the blocks composing the macroblocks is analyzed to classify each macroblock as one of two image types.

The system provided by the invention can operate upon color documents as well as gray scale documents.

BRIEF DESCRIPTION OF THE DRAWINGS

The foregoing and other objects, features and advantages of the invention, as well as the presently preferred embodiment thereof, will become more apparent from a reading of the following detailed description in connection with the accompanying drawings in which.

DETAILED DESCRIPTION OF THE INVENTION

Figure 1:
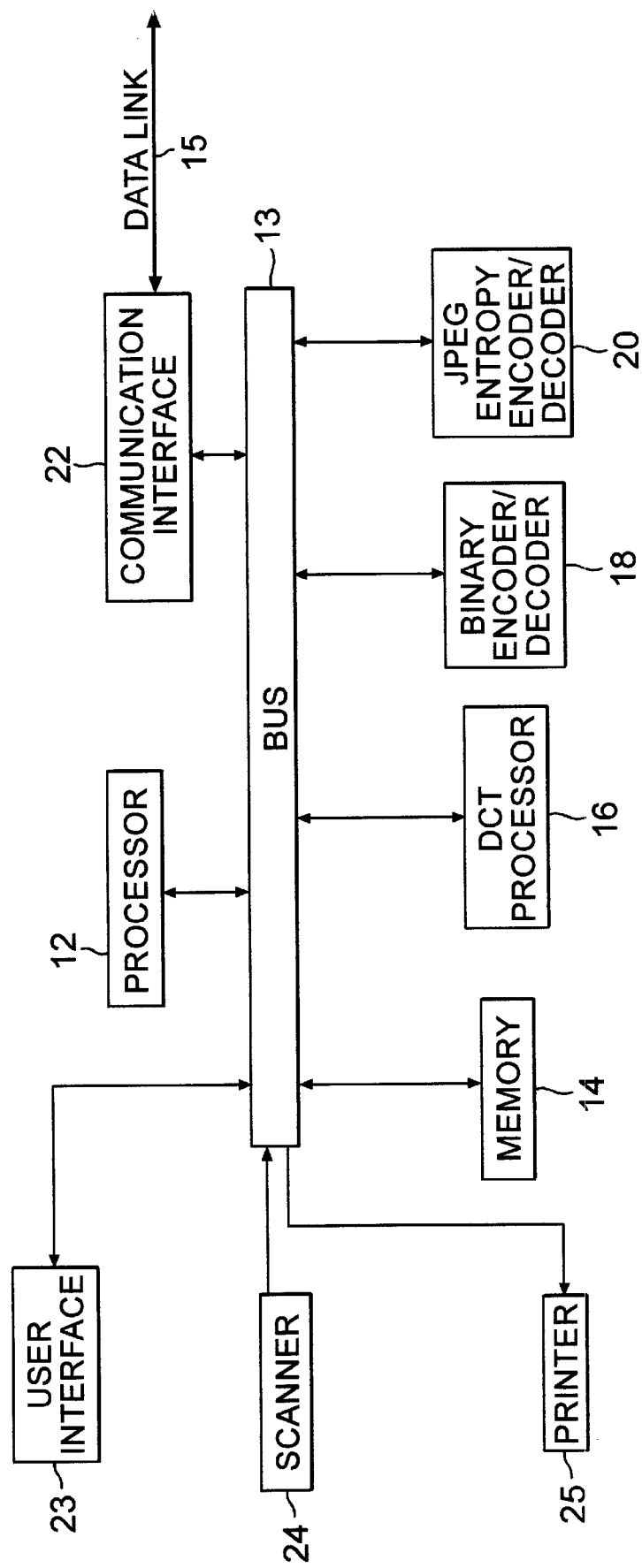
FIG. 1 is a block diagram of a system which implements the invention.

Referring to FIG. 1, there is shown a block diagram of a system 10 in accordance with the present invention. System 10 includes bus 13 coupling processor 12, memory 14, DCT processor 16, binary encoder/decoder 18, JPEG entropy encoder/decoder 20, communication interface 22, user interface 23, scanner 24, and printer 25. Processor 12 may be a commercially available digital microprocessor having a programmed set of instructions controlling the operation of system 10. Data storage in system 10 is provided by memory 14, however other components shown in FIG. 1 may have internal data storage. Examples of memory 14 include ROM and RAM devices. DCT processor 16 provides discrete cosine transform (DCT) processing of pixels based on their gray scale values to produce DCT coefficients and quantized DCT coefficients. Processor 12 stores quantization tables which are sent to DCT processor 16 which uses quantization table elements (also called the quantizer step size) in quantizing the DCT coefficients. In a preferred embodiment, these are JPEG quantization tables. Operation of DCT processor 16 will be discussed later in more detail. Binary encoder/decoder 18 provides standard fax coding and decoding processes on binarized pixels having 1 (black) or 0 (white) values, such as performed in Group 3 or Group 4 type facsimile machines, or by JBIG or ToneFac data compression techniques. Examples of JBIG techniques are described in: CCITT Draft Recommendation T.82 ISO/IEC Draft International Standard 11544, WG9-SIR5.1,"Coded representation of picture and audio information— progressive bi-level image compression," Apr. 3, 1992. ToneFac techniques are described in: K. J. Parker and A. C. Cheung, "Efficient fax transmission of halftone images," Journal of Electronic Imaging, vol. 1, no. 2, 203–208, April 1992.

JPEG entropy encoder/decoder 20 provides encoding and decoding of pixels based on their gray scale values according to JPEG standards. JPEG encoding and decoding is described in: Digital Compression and Coding of Continuous-tone Still images, Part I, Requirements and Guidelines. ISO/IEC JTCI Draft International Standard 10918-1, November 1991. Encoding in JPEG entropy encoder/decoder 20 utilizes quantized DCT coefficients received from DCT processor 16. Alternatively, JPEG entropy encoder/decoder 20 operations may be performed by a JPEG encoder/decoder which can provide the processing performed by DCT processor 16, thereby making DCT processor 16 unnecessary.

Communication interface 22 interfacing the system with a two-way external data link 15 for receiving and transmitting image data representing documents. Interface 22 may be a conventional modem or a network interface. Digitizing of documents into primitive documents is performed by scanner 24, which sends primitive document image data to system 10 via bus 13 for storage in memory 14. Printer 25 preferably is a continuous tone printer which is capable of printing image data of pixels having gray scale values, although, other types of printer may be used, such as binary raster scan, halftone, or multitone printers. Additional processing of image data is required in non-continuous tone printers, and will be described later. Bus 13 represents one or more data and address buses for communication between components shown in FIG. 1. User interface 23 provides upper level control of system 10 by a user, such as through an LCD display or keypad. The set of instructions upon which processor 12 operates responsive to, are themselves responsive to upper level commands received from user interface 23. These instructions may be stored in processor 12 or memory 14.

Many of the components in FIG. 1 are commercially available integrated chips (ICs), such as processor 12, memory 14, and JPEG entropy encoder/decoder 20. Also, DCT processor 16 may be provided on JPEG IC chips. System 10 may be provided as a part of a standard facsimile machine, or as in the herein illustrated preferred embodiment, integrated into a computer system. In this preferred embodiment, primitive document image data is received by system 10 from either scanner 24, or along an external data line (not shown in FIG. 1) coupled to bus 13 upon which the data representing a primitive document may be received from storage (memory) of the computer system. User interface 23 is an interface to the computer system and provides upper level control in system 10. Scanner 24 and printer 25 are optional. For example, system 10 may be contained on a fax/modem card in a computer system.

Figure 2A:
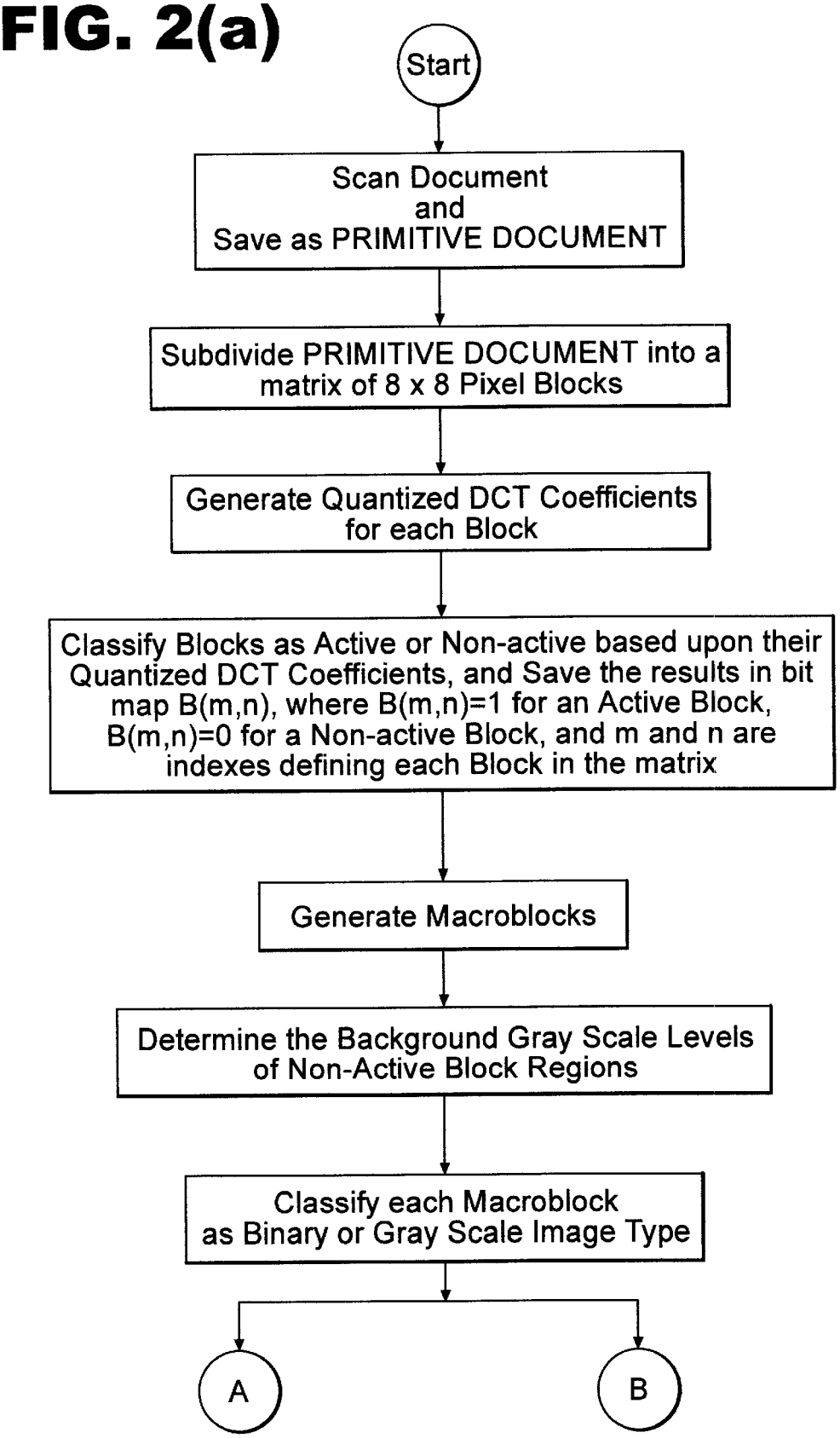
FIGS. 2(a), (b), (c), and (d) is a flow chart of a program by which the processor shown in FIG. 1 operates for generating a smart document.

System 10 provides for both generation and reproduction of smart documents. FIGS. 2(a), (b), (c), and (d) is a flow chart showing the program in system 10 for generating a smart document from a primitive document. These figures are connected by branches in the flow chart indicated by alphanumeric connector blocks, for example the "A" connector on FIG. 2(a) represents the same branch as the "A" connector on FIG. 2(b). Referring now to FIG. 2(a), a document is scanned by scanner 24, and the resulting lines of the image data are saved in memory 14 as PRIMITIVE DOCUMENT. PRIMITIVE DOCUMENT represents a two dimensional array of pixels (or pixel signals) having gray scale values representative of the document page. Preferably, each pixel has an eight bit gray scale value (0 to 255). The PRIMITIVE DOCUMENT is then subdivided into a matrix of non-overlapping small local regions of pixels called blocks. The preferred size of each block in the matrix is 8×8 pixels because this size is compatible with JPEG processing and DCT processing in system 10, however, other block sizes may be used.

Each block is classified as active or non-active based on the gray scale values of the pixels within the block. Active blocks include blocks representing pixels in image components of the scanned document containing text, halftone, or continuous tone (gray scale) image types. Non-active blocks include blocks representing pixels in the image components of the scanned document containing gray and white flat regions. Testing each block for activity may be performed on the gray level values of the pixels in the block using a histogram analysis, edge detector filters, or by analyzing orthogonal transform coefficients. In the preferred embodiment, quantized DCT coefficients represent the gray scale values of the pixels in each block. DCT coefficients can distinguish patterns of pixels and how pixels relate to each other in a block. DCT processor 16 generates these quantized DCT coefficients by determining DCT coefficients for the block by addressing corresponding pixels of PRIMITIVE DOCUMENT in memory 14, finding the quantization table element (quantizer step size) for each DCT coefficient, and then dividing DCT coefficient by its corresponding quantization table element. The quantization tables are received by DCT processor 16 from processor 12 via bus 13 prior to the above operation.

The blocks are classified as active or non-active by calculating activity for each block using the block's quantized DCT coefficients. Each summed term in the below equation represents a quantized DCT coefficient of a different zigzag order. Activity of the $m^{th}$ by $n^{th}$ block in the matrix is determined by the following summation:

$$Activity_{m,n} = \sum_{k=1}^{63} \left| NINT\left(\frac{ZZ_{m,n}(k)}{Q_{m,n}(k)}\right) \right| \quad (1)$$

where:
  k=index in the zigzag order from 0 to 63 (however, since only AC DCT coefficients are required k ranges from 1–63 omitting when k=0 which represent the DC DCT coefficient);
  $ZZ_{m,n}(k)$=the DCT Coefficient of the $k^{th}$ order in the $m^{th}$ by $n^{th}$ block in the matrix;
  $Q_{m,n}(k)$=the quantization table element corresponding to the $k^{th}$ DCT Coefficient of the $m^{th}$ by $n^{th}$ block in the matrix; and
  NINT=a nearest integer function.

If $Activity_{m,n}$ is greater than a preset threshold T, then the block is active, otherwise the block is non-active. Threshold T is an empirically derived, and is set to distinguish blocks corresponding to text, halftone, or gray scale images from gray or flat regions. In other words, blocks having more image information, such as text or continuous tone images, will have $Activity_{m,n}$ levels in excess of threshold T, indicating that such block should be classified as active. The result of the classification of the blocks is stored in memory 14 in bit map B(m,n), which has bits in a one to one correspondence with the blocks of the matrix subdividing PRIMITIVE DOCUMENT. In B(m,n) active blocks are represented by bits set to 1, and non-active blocks bits set to 0.

Higher orders of DCT coefficients represent higher frequencies of the pixels in the block. Also, note that higher zigzag orders, k, the higher is the order of the DCT coefficients, $ZZ_{m,n}(k)$, and the greater is the value of the quantization table element, $Q_{m,n}(k)$ Accordingly, in the quantized DCT coefficients of the summed terms of equation (1), the quantization table elements operate as weights, driving to zero terms having smaller high frequency detail in the block represented by higher orders of DCT coefficients. This high frequency detail is not visually significant to human visual perception. Thus, the activity classification in system 10 incorporates human visual response to local regions, i.e. blocks, of the scanned document represented by PRIMITIVE DOCUMENT.

Figure 4A:
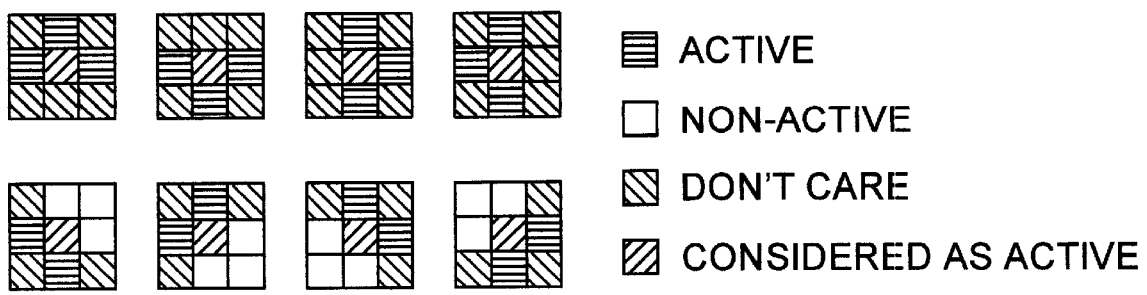
FIG. 4(a) is an illustration of configurations of active and non-active blocks which may occur while generating macroblocks using the program of FIG. 3.

After all blocks are classified as active or non-active and the results are stored in B(m,n), generation of macroblocks begins. Macroblocks are generated by grouping one or more adjacent blocks in the matrix responsive to their activity classification. To generate these macroblocks, the blocks represented in B(m,n) are successively scanned. During scanning, each non-active block is checked according to two rules as to whether the block should be reclassified as an active block by changing the bit representing the block in B(m,n) from zero to one. These rules are based on the activity classifications of the blocks neighboring the subject non-active block. According to Rule 1, if at least three of the four neighboring blocks which are non-diagonal with the subject non-active block are active, then the subject non-active block is made active. Application of Rule 1 is shown in the top four configuration examples of FIG. 4(a) where the centered block is the subject non-active block. According to Rule 2, if two of the four neighboring blocks, which are both not diagonal with the subject non-active block and diagonal to each other are active, and also a neighboring non-active block is diagonal to the subject non-active block, but not a neighbor of the first two active blocks, then the subject non-active block is made active. Application of Rule 2 is shown in the bottom four configuration examples of FIG. 4(a) where the centered block is the subject non-active block.

A counter ("counter A") in system 10 (see FIG. 3), which starts from zero, indexes every time a non-active block is changed to active. If counter A is greater than zero after scanning is complete, then at least one change occurred in B(m,n) during the scan. Counter A is then reset to zero, and scanning of B(m,n) repeats in the manner described above. If counter A equals zero after a scan of B(m,n), then macroblock generation is complete. This is a recursive operation since changes to B(m,n) in each prior scan are used in each subsequent scan. Several scans of B(m,n) may be required.

After the generation of macroblocks is completed, system 10 identifies each macroblock by searching for closed group of adjacent active blocks represented by bits in B(m,n) set to 1. This is based on the assumption that image components in PRIMTIVE DOCUMENT are at least 16 pixels apart. If this assumption is violated, then macroblocks may merge which can result in a macroblock containing mixed image types. The macroblocks are the segments of PRIMITIVE DOCUMENT in terms of the blocks and pixels they represent. Note that the segments formed may be of various shapes, and are not limited to rectangular sizes. Further, the formation of segments is not sensitive to the tilt or angular relationship at which image regions may be to each other in PRIMITIVE DOCUMENT because each macroblock is independently formed by grouping smaller regions of active blocks.

Figure 4B:
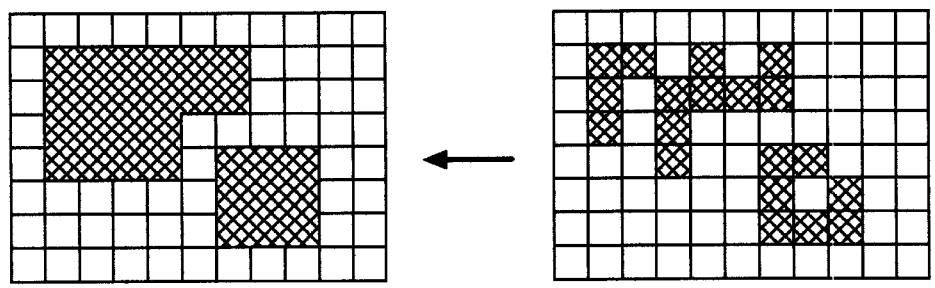
FIGS. 4(b) and (c) are illustrations depicting examples of macroblock generation using the program of FIG. 3.
Figure 4C:

In FIG. 4(b), an example of macroblock generation is shown for a part of B(m,n), wherein active blocks are illustrated as hashed, and non-active blocks are illustrated as white. On the right in FIG. 4(b) is the state of B(m,n) before macroblock generation, and on the left is the state of B(m,n) after macroblock generation. An example of an entire B(m, n) after macroblocks are generated is shown in FIG. 4(c). FIG. 4(c) also shows on a larger scale the entire segmented PRIMITVE DOCUMENT. Each closed white area in FIG. 4(c) represents a macroblock or segment.

Figure 3:
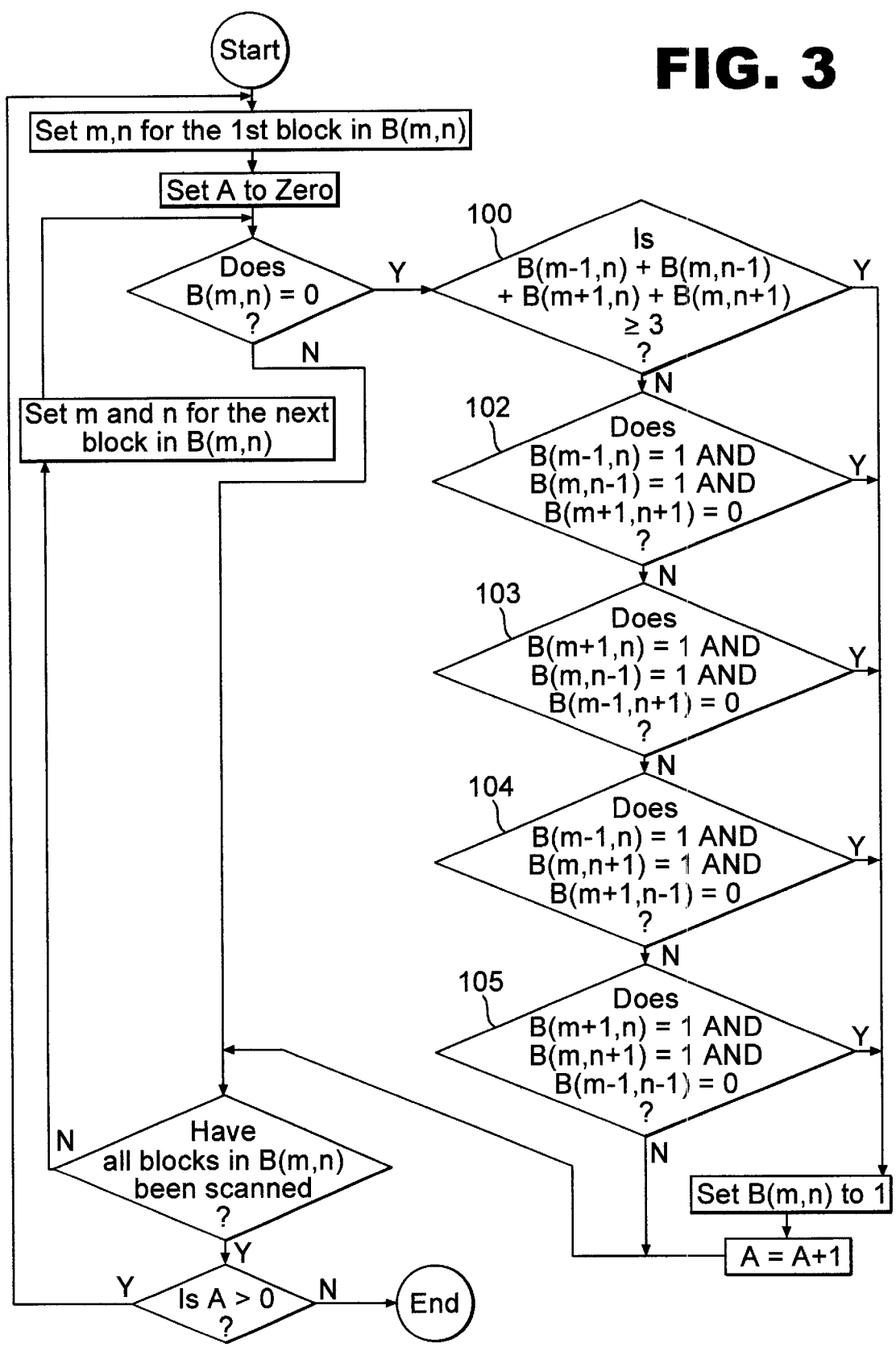
FIG. 3 is a flow chart illustrating in more detail parts of the program shown in FIG. 2(a) for generating macroblocks.

Referring to FIG. 3, there is shown a flow chart which illustrates in greater detail the part of the program in FIG. 2(a) for generating macroblocks. Scanning of B(m,n) starts by setting indexes m and n to the first block in B(m,n), and setting counter A to 0. For each non-active block, i.e., where B(m,n)=0, four checks are performed at steps 100–105. Step 100 is a process which implements Rule 1, which is represented as a logic equation to determine whether B(m−1,n)+B(m,n−1)+B(m+1,n)+B(m,n+1)$\geq$3. If so, B(m,n) is set to 1, and counter A is indexed. Steps 102, 103, 104, and 105 are processes which implement Rule 2, and are represented as logic equations to determine: whether B(m−1, n)=1 and B(m,n−1)=1 and B(m+1,n+1)=0; B(m+1, n)=1 and B(m,n−1)=1 and B(m−1,n+1)=0; B(m−1, n)=1 and B(m,n+1)=1 and B(m+1,n−1)=0; or, B(m+1, n)=1 and B(m,n+1)=1 and B(m−1,n−1)=0. If any of these four logic equations is true, then B(m,n) is set to 1, and counter A is indexed. System 10 then sets m and n to the next block in B(m,n) and steps 100–105 are performed if B(m,n) equals zero. Each block in B(m,n) is scanned in this manner. After all blocks in B(m,n) have been scanned, a check is made as to whether counter A is greater than 0. If not, then macroblock generation is complete; otherwise m and n are reset to the first block in B(m,n), counter A is reset to 0, and scanning of B(m,n) is repeated where all bits changed in B(m,n) are retained from prior scans.

Figure 5:
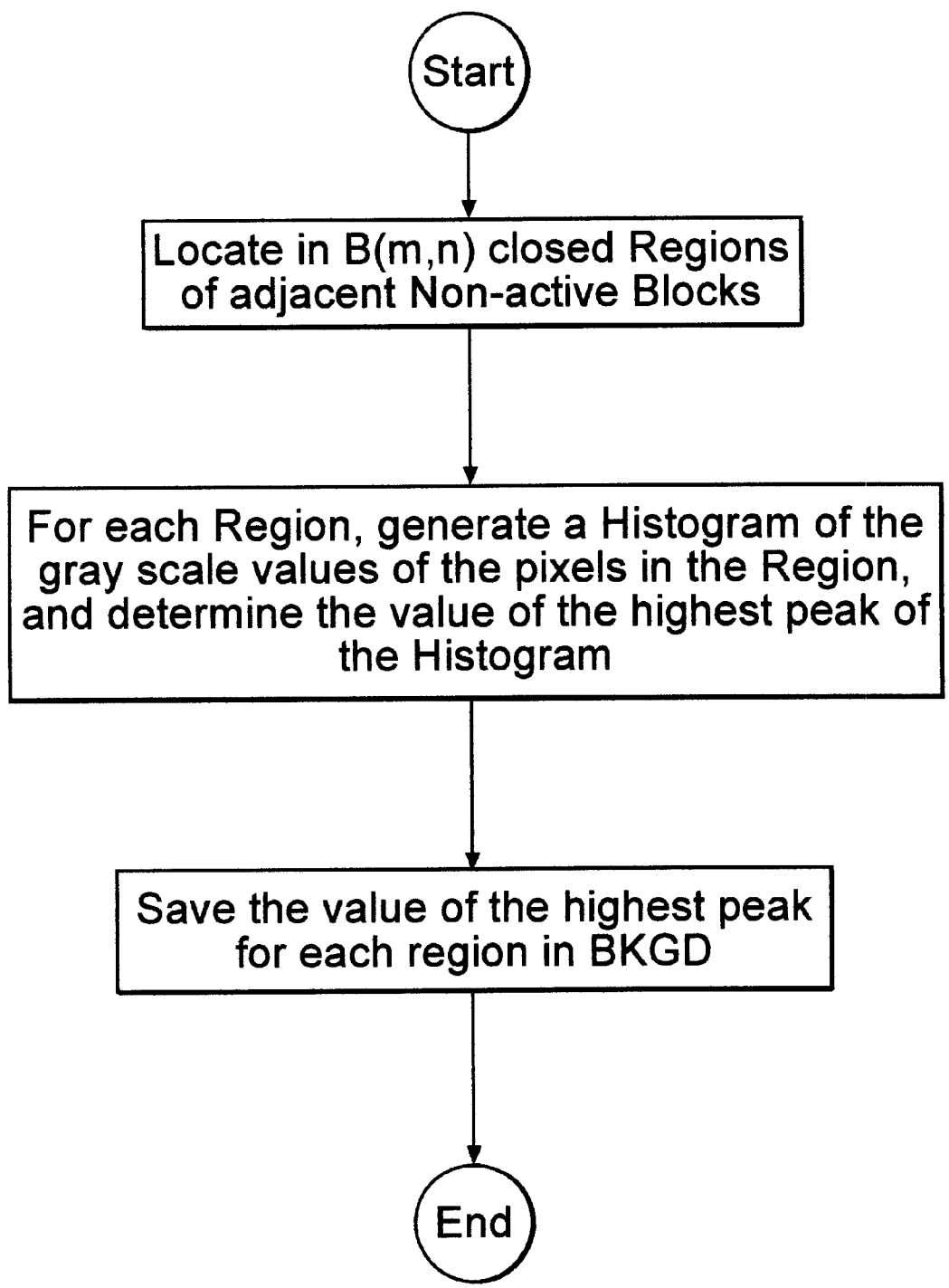
FIG. 5 is a flow chart illustrating, in more detail, parts of program of FIG. 2(a) for determining background gray scale levels of non-active block regions.

Referring back to FIG. 2(a), the background gray scale levels of non-active block regions in B(m,n) are next determined. This part of the program of FIG. 2(a) is illustrated in the flow chart of FIG. 5. In FIG. 5, system 10 locates in B(m,n,) closed regions of adjacent non-active blocks by analyzing B(m,n) for continuous regions of bits which are set to one. For example, to locate a non-active block region, an initial non-active block in B(m,n) is selected for the region and any non-active blocks adjacent to that non-active block are then added to the region. In an iterative fashion, each added non-active block is then selected and adjacent non-active blocks to that block are added to the region if not already in the region. The above repeats until no more non-active blocks can be added to the region, thus establishing a closed non-active block region. In the B(m,n) example of FIG. 4(c), one closed non-active block region is shown in black.

Next, for each region located, a histogram of the gray scale values of pixels in the blocks of the region is generated. The gray scale values of these pixels are stored in memory as PRIMITIVE DOCUMENT. The prevalent gray scale value of the pixels in the region is then found by determining the value of the highest peak of the histogram. This highest peak value represents the background gray scale value for the region. The prevalent value thus represents image background data. In this manner, background level data is found for each non-active block region. All of the background level data are saved in BKGD. Note that the background levels are stored in BKGD in an order coinciding with the relative position of their corresponding non-active block regions in B(m,n), such as in right-left, top-down order. This facilitates identification of each stored background level with each non-active block region in later processing.

Figure 6A:
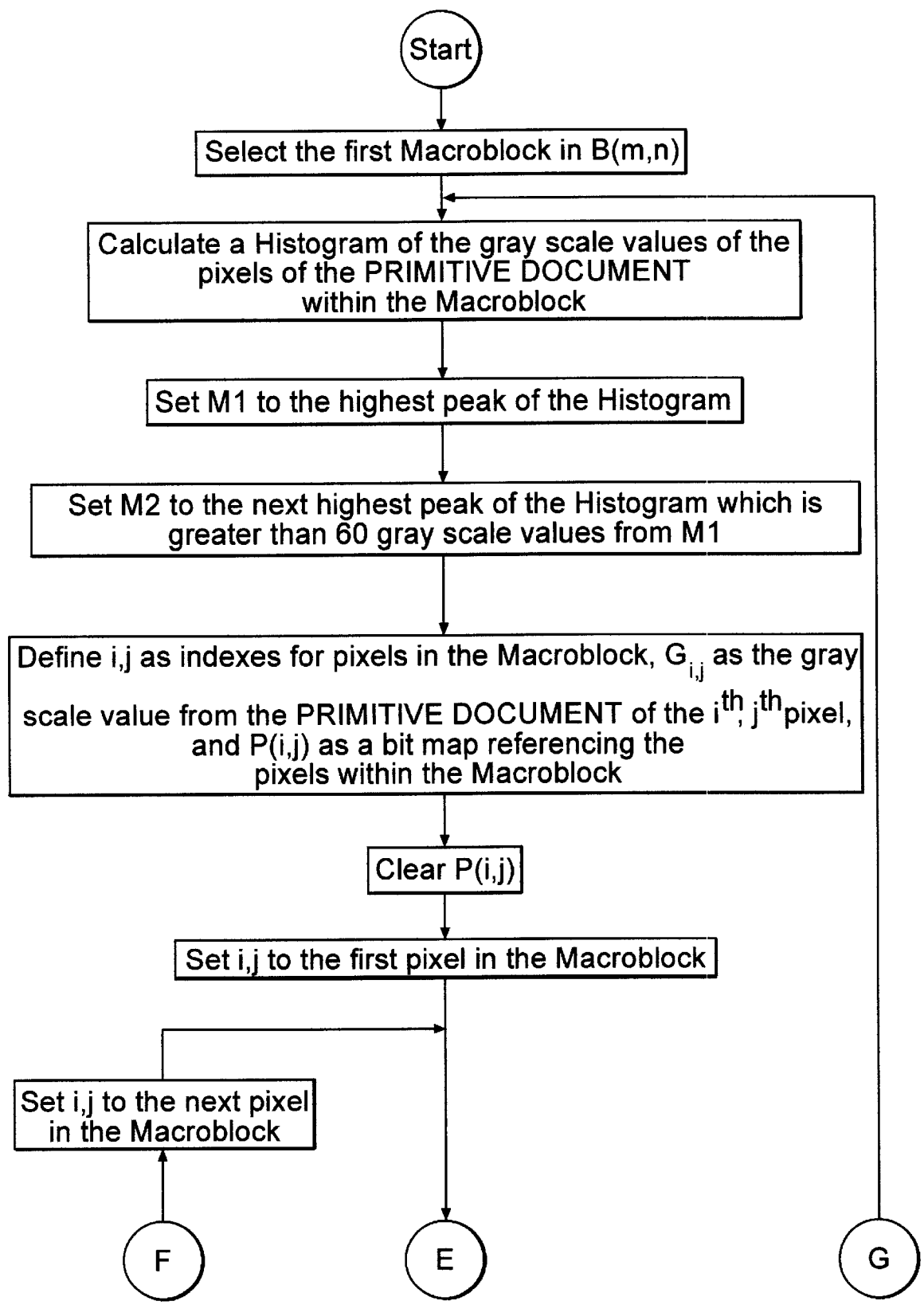
FIGS. 6(a) and 6(b) is a flow chart illustrating, in more detail, other parts of the program of FIG. 2(a) for classifying macroblocks as binary or gray scale image types.
Figure 6B:
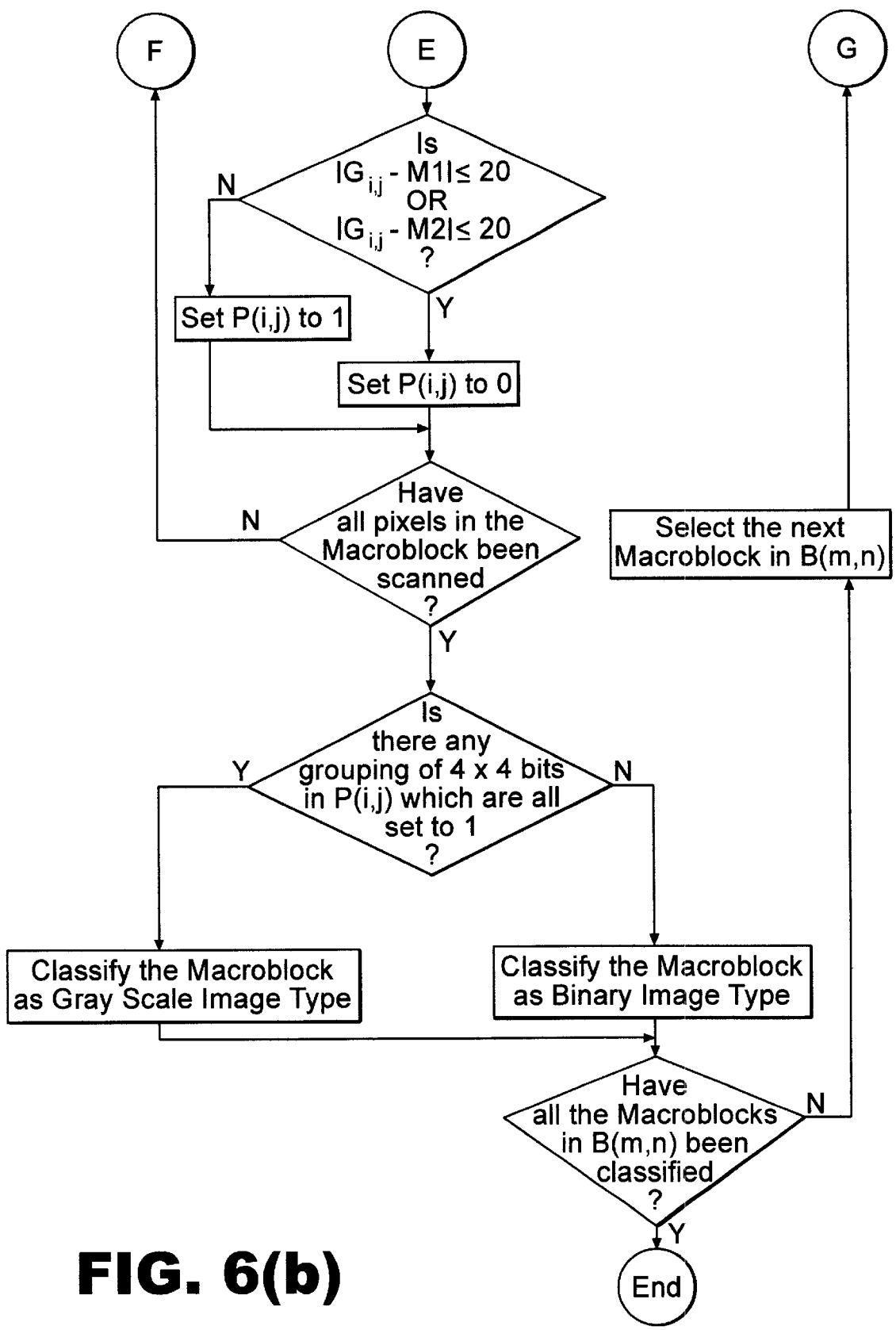

Referring back to FIG. 2(a), the macroblocks are next classified as binary or gray scale image types. The part of the program in FIG. 2(a) for the classification operation in system 10 is shown in the flow chart of FIGS. 6(a) and 6(b). Binary image type refers to a macroblock encompassing pixels having gray scale values which have one of two levels representing a foreground and background values, such as text. Gray scale image types refer to a macroblock encompassing pixels having gray scale values, such as continuous tone images. In FIGS. 6(a) and 6(b), classification starts by selecting the first macroblock in B(m,n) to be classified. In the preferred embodiment, macroblocks are processed in a top-down right-left order. A histogram of the gray scale values of the pixels from the PRIMITIVE DOCUMENT is calculated within the selected macroblock. This may be achieved by referencing the pixels stored in PRIMITIVE DOCUMENT for each block of the matrix which composes the selected macroblock. Variable M1 and M2 are then set M1 is set to the gray scale value of the highest peak of the histogram, and M2 is set to the gray scale value of the next highest peak of the histogram which is greater than sixty gray scale values from M1. The minimum of sixty gray scale values between M1 and M2 distinguish foreground and background levels when the selected macroblock is of a binary image type within a gray scale range of 0 to 255. However, minimum gray scale values other than sixty may be chosen to provide different sensitivity of system 10 to binary type macroblocks, or to achieve comparable results with other gray scale ranges.

After M1 and M2 are set, the pixels of the primitive document contained in the selected macroblock are tested as described below. By way of definition, i and j represent indexes for referencing the pixels in the macroblock, $G_{ij}$ is the gray scale value of the $i^{th}$, $j^{th}$ pixel in the macroblock, and bit map P(i,j) is created in memory 14. The bits in P(i,j) correspond to the position of the pixels in the selected macroblock; thus, P(i,j) matches the shape of the macroblock. P(i,j) is cleared and ij is set to the first pixel in the macroblock. A first check determines whether the absolute value of the difference of the gray level value of $G_{ij}$ from M1 or M2 is less than or equal to twenty, as expressed in equations: $|G_{ij}-M1| \leq 20$ or $|G_{ij}-M2| \leq 20$. If so, then the bit at P(i,j) is set to zero, otherwise P(i,j) is set to one. A second check determines whether all pixels in the macroblock have been tested by the first check. If not, i and j are set to the next pixel in the macroblock, and the first and second checks are again performed. If all pixels in the macroblock have been tested, then another check determines whether there is any grouping of U×V bits, for example 4×4 bits, in P(i,j) which are all set to one. If so, the macroblock is classified as gray scale image type, otherwise, the macroblock is classified as binary image type. A binary macroblock contains pixels which are binarizable, such as text, while gray scale macroblocks contain pixels which are considered non-binarizable, such as continuous tone images. System 10 then selects the next macroblock to be classified in B(m,n) and the above procedure is repeated. This continues until all macroblocks are classified. The classification of each macroblock is stored in memory 14.

The advantage of performing the above classification process is shown by the following examples: In the case of a macroblock representing a text image, a histogram will be generated wherein M1 and M2, if sufficiently distinct by sixty gray scale levels, will represent the text and the background gray scale levels, or vise versa. In the macroblock, when the image shifts from background to text and text to background, the pixels at such shifts exhibit sharp or abrupt transitions in their gray scale values with few pixels having intermediate values greater than twenty from M1 or M2. Although these intermediate valued pixels may cause some bits in P(i,j) to be set to one, it is unlikely these bits will concentrate in a 4×4 grouping of ones in P(i,j) unless the text edges are very blurred. Thus, the macroblock is properly classified as binary. In the event that text edges are blurred and not well defined, large areas of intermediate valued pixels between M1 and M2 can occur at shifts in the image from background to text and text to background. If these areas are sufficiently large, this may result in one or more 4×4 groupings of ones in the bits of P(i,j). Thus, a macroblock with blurred text may be classified as gray scale. This is a desired result in reproduction of a document, since high quality reproduction requires accurate reproducing of even blurred text. In addition, pixels representing image noise in a macroblock may cause some P(i,j) bits to be set to one. However, since image noise will unlikely concentrate in a 4×4 pixel grouping, an otherwise binary macroblock should not be categorized as gray scale.

Macroblocks representing halftone images may be classified either as gray scale or binary image type depending on the resolution of scanner 24 digitizing a document into PRIMITIVE DOCUMENT. These macroblocks may be classified as a binary image type if the white and black dots of halftone images are resolved by scanner 24, hence generating a bimodal histogram similar to that of a text image type. However, if halftone images are scanned at a low resolution by scanner 24, the dots comprising the halftone image will be blurred in PRIMITIVE DOCUMENT, causing a non-bimodal histogram of the macroblocks pixel values. This may result in a gray scale image type classification.

A still further example is a macroblock representing a gray scale image component, a histogram representing the pixels of this macroblock will generate M1 and M2, but areas of slow transitions of pixels from one gray scale to another will cause in P(i,j) at least one, if not multiple 4×4 groupings of one bits. Thus, such a macroblock will properly be classified as gray scale image type.

The order in which macroblocks are processed in system 10 is important to provide correspondence between the macroblocks and their format information to be stored in the smart document. This facilitates later reproduction of document from the smart document at a receiver, which is later described in connection with FIG. 7.

Figure 2B:
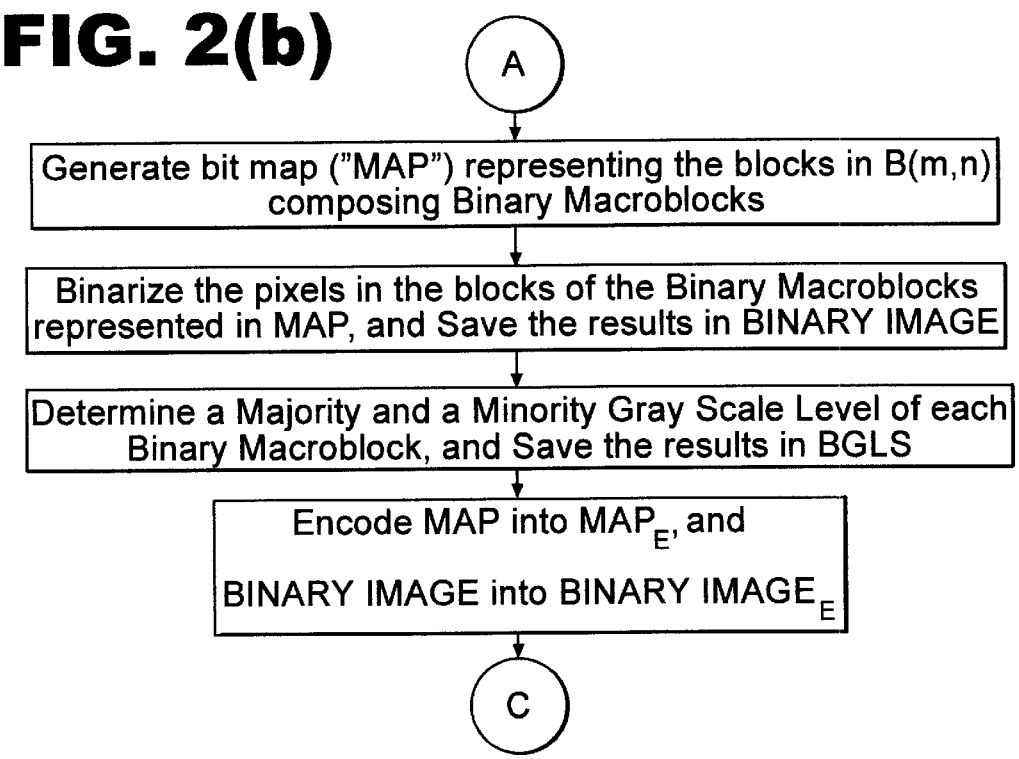
Figure 2C:
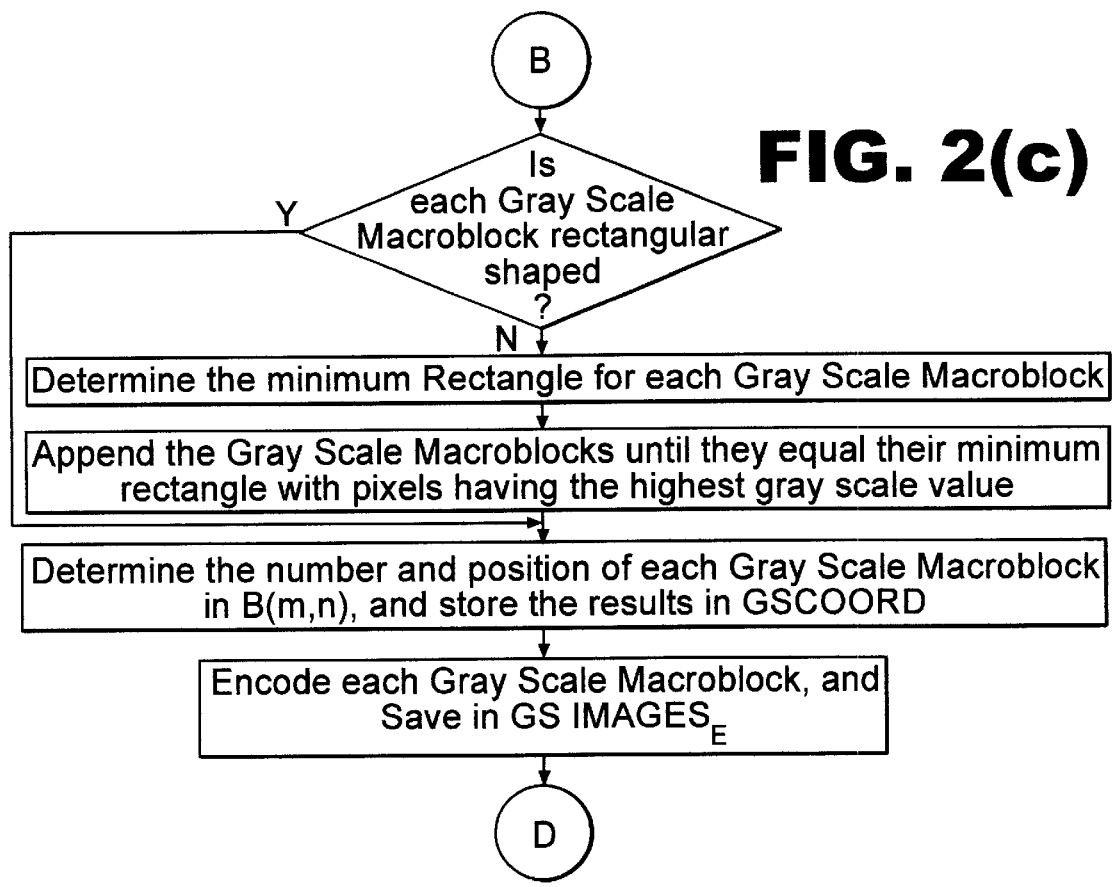

Referring back to FIG. 2(a), after all the macroblocks in B(m,n) are classified, the program in system 10 continues along two branches to the flow chart of FIGS. 2(b) and 2(c). These figures represent parallel routines; however, and alternatively, the routines may be performed serially. FIG. 2(b) shows the part of the program for further processing of binary macroblocks, while FIG. 2(c) shows the part of the program for further processing of gray scale macroblocks.

Referring to FIG. 2(b), a bit map, MAP, is generated corresponding to B(m,n) wherein bits set to one represent the blocks composing binary macroblocks, all other bits are set to zero. Using MAP to identify the blocks of each binary macroblock, the pixels in these blocks are binarized as described below. For each binary macroblock a different threshold function is determined. The macroblocks are effectively locally thresholded. The results of the threshold function for each pixel are saved in BINARY IMAGE, a bit map corresponding to the positions of the pixels in PRIMTIVE DOCUMENT. This threshold function provides that when a pixel has a gray scale value greater than or equal to the threshold value, the bit corresponding to the pixel is set to one, otherwise the bit is set to zero. The threshold value is set to properly quantize pixels to two levels to separate pixels representing foreground and background gray scale values. Preferably, the threshold value equals 0.6M1+0.4M2, and M1 and M2 are the same variables as used in classifying macroblock (FIGS. 6(a) and 6(b)) for the binary macroblock. Bits in BINARY IMAGE are set to zero to represent a white pixel, and to one to represent black pixel. In a less preferred embodiment, a fixed threshold value (a global threshold) may be empirically derived in system 10 for all binary macroblocks which adequately distinguish foreground and background gray scale levels.

Next, a majority and a minority gray scale level of each binary macroblock are determined. The majority gray scale level is the gray scale value which appears most frequently in the pixels of the binary macroblock, while the minority gray scale level is the next most frequently appearing gray scale value in the same macroblock. The majority and minority levels essentially characterize the background and foreground levels of the macroblock. In the preferred embodiment, the majority and minority levels are represented by M1 and M2, respectively. However, a statistical analysis may separately be performed on the gray scale values of the pixels of a binary macroblock to determine the two modes which characterize the majority and minority levels of the macroblock. The majority and minority gray scale levels for each binary macroblocks are saved in BGLS.

In an alternative embodiment, an additional step is performed after the majority gray scale level of a binary macroblock is determined to match the background gray scale level of the non-active block region surrounding the binary macroblock with the majority level, which represents the background gray scale level of the binary macroblock. BKGD stores the background level of each non-active block regions (see FIG. 5). For example, where the majority and minority levels are 190 and 10 respectively, and the background level of the non-active block region surrounding the macroblocks is 200, the majority level is reset to 200. This assures uniformity of the background levels between binary macroblocks and the non-active block regions.

Binary encoder/decoder 18 then encodes MAP into $MAP_E$, and BINARY IMAGE into BINARY $IMAGE_E$. Although encoding is preferred in system 10 to yield optimum data compression results, encoding of MAP and BINARY IMAGE may be optional in system 10. Processing then continues along a branch to FIG. 2(d), as indicated by connector C.

Referring to FIG. 2(c), a first check determines whether each gray scale macroblock is rectangular shaped. This may be achieved by checking the shape of these macroblocks in B(m,n). If any gray scale macroblock is not rectangular shaped, then a minimum rectangle size is determined for the gray scale macroblock in terms of block coordinates in B(m,n). These non-rectangular gray scale macroblocks are then appended with pixels having the highest possible gray scale value (e.g. 255 for gray scale range of 0–255) until they equal their minimum rectangle size. This operation affects neither B(m,n) nor PRIMITIVE DOCUMENT. After all non-rectangular gray scale macroblocks have been processed into rectangular macroblocks, the number of gray scale macroblocks and the position of each gray scale macroblock is determined, and the results are stored in GSCOORD. Preferably, the position data in GSCOORD describes the location of the top left-most block (having appended or unappended pixels) of each gray scale macroblock in terms of coordinates in B(m,n).

Next, the pixels composing each gray scale macroblock are encoded by JPEG entropy encoder/decoder 20, and the results are saved in GS $IMAGES_E$. The order in which the gray scale macroblocks are stored in GS $IMAGES_E$ corresponds with the order their position data are stored in memory as GSCOORD. Although encoding is preferred in system 10 to yield optimum data compression results, encoding of the gray scale macroblocks may be optional in system 10. Processing thereafter continues along a branch to FIG. 2(d), as indicated by connector D.

Figure 2D:
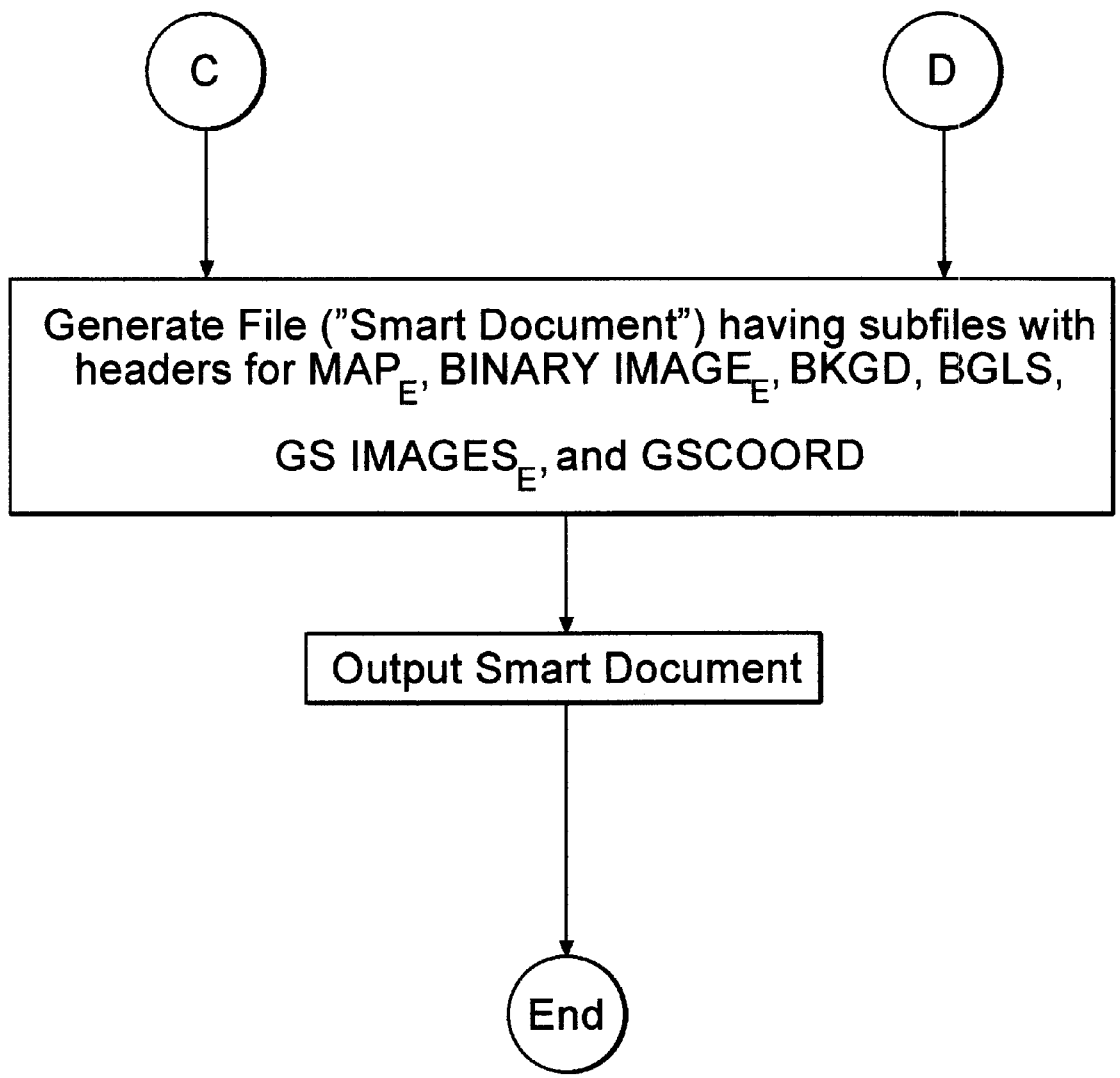

After operations in FIGS. 2(b) and 2(c) are complete, a file is generated in FIG. 2(d) having subfiles with headers for $MAP_E$, BINARY $IMAGE_E$, BKGD, BGLS, GS $IMAGES_E$, and GSCOORD. This file represents the compressed smart document and will be referred to as "smart document". Alternatively, where encoding in FIGS. 2(b) and 2(c) is not used, the smart document file contains MAP, BINARY IMAGE, and GS IMAGES, rather than their encoded versions. Smart document generation is now complete. The smart document may then be output by system 10 and transmitted via communication interface 22 along data link 15. This smart document consists of two parts, information about the compressed segments of PRIMITIVE DOCUMENT in BINARY $IMAGE_E$ and GS $IMAGES_E$, and format information in $MAP_E$, BKGD, BGLS and GSCOORD. Other representations of the format information may be made in the smart document so long as there is sufficient information describing the segments and the background regions of PRIMITIVE DOCUMENT.

Figure 7:
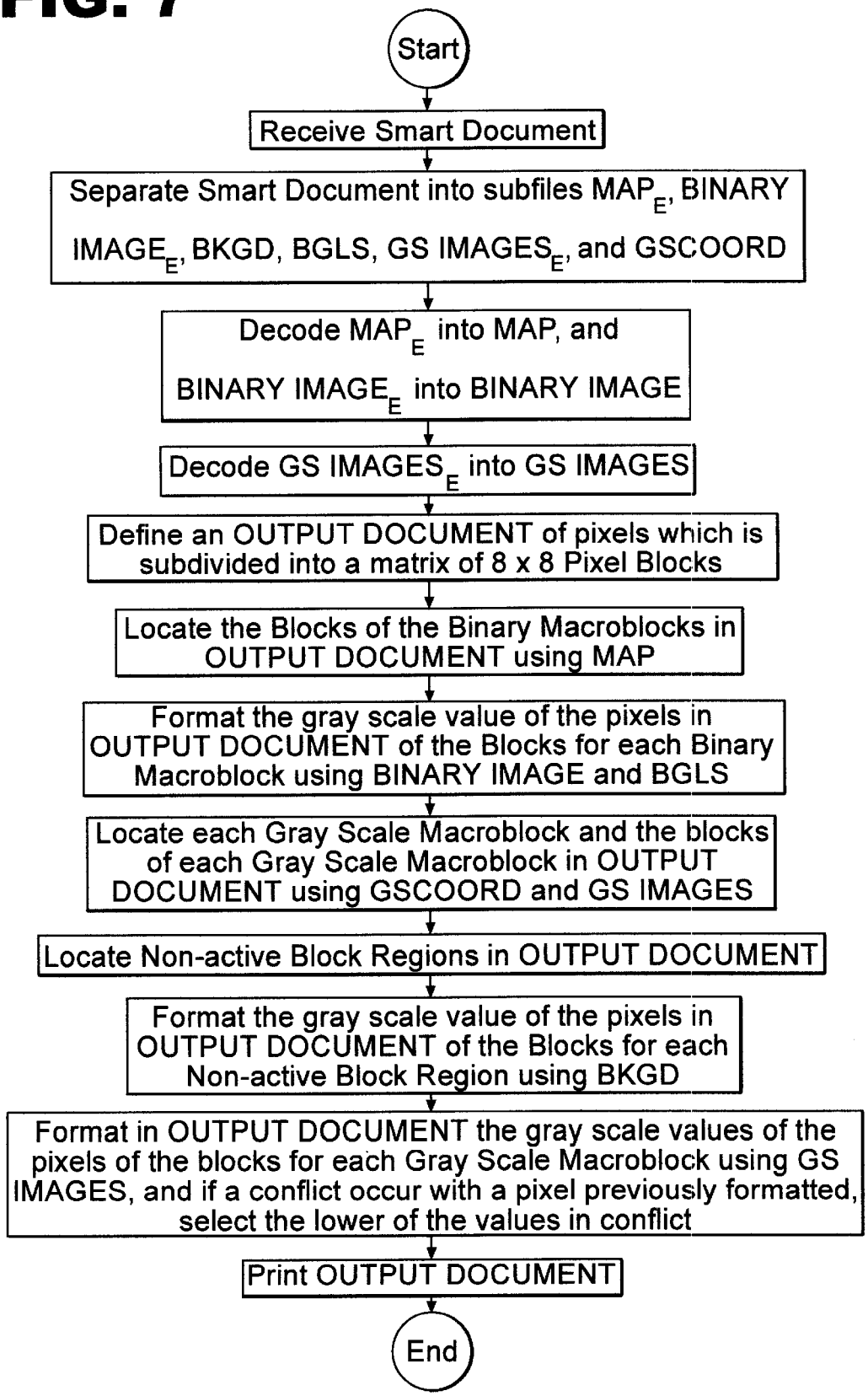
FIG. 7 is a flow chart showing a program which is operative for receiving and processing a smart document when embodied in processor of the system of FIG. 1.

System 10 also operates to receive smart documents, and for recovering and reproducing the image described by the received smart document. The program for this operation is described in the flow chart of FIG. 7. Referring now to FIG. 7, the smart document is first received by system 10 through communication interface 22. Thereafter, the subfiles comprising the smart document are separated according to their headers to provide $MAP_E$, BINARY $IMAGE_E$, BKGD, BGLS, GS $IMAGES_E$, and GSCOORD, which are stored in memory 14. Next, $MAP_E$ is decoded into MAP and BINARY $IMAGE_E$ is decoded into BINARY IMAGE by binary encoder/decoder 18. Further, GS $IMAGES_E$ is decoded into GS IMAGES using JPEG entropy encoder/decoder 20. The decoded files may replace their encoded versions in memory 14. Alternatively, if there was no encoded files in the smart document, the above decoding steps are not performed since MAP, BINARY IMAGE, and GS IMAGES were subfiles in the received smart document file.

An OUTPUT DOCUMENT (or output page) is then, in memory 14, represented as a two-dimensional array of pixels, which is subdivided into a matrix of blocks of the same size as used in generating the smart document, preferably each block contains 8×8 pixels. MAP contains the binary macroblocks. Using MAP, the blocks composing the binary macroblocks are then located in OUTPUT DOCUMENT. The gray scale values of the pixels in OUTPUT DOCUMENT are formatted in the blocks of the binary macroblocks using BINARY IMAGE and BGLS. BINARY IMAGE contains data as to whether a pixel in each binary macroblock should be set to either the majority gray scale level or the minority gray scale level, while BGLS provides the specific gray scale values of the majority and minority gray scale levels of each binary macroblock. The majority and minority levels in BGLS are stored in an order corresponding to the order of the binary macroblocks in MAP. Specific binary macroblocks are identified by analyzing for closed groups of bits equalling one in MAP.

Next, each gray scale macroblock and the blocks of each gray scale macroblock are located in OUTPUT DOCUMENT using GSCOORD and GS IMAGES. Since GSCOORD provides the positions of the gray scale macroblocks, and the size of the gray scale macroblocks may be obtained from GS IMAGES, the blocks of each gray scale macroblock may be located.

Non-active block regions are then located in OUTPUT DOCUMENT. All blocks in OUTPUT DOCUMENT which are not part of either a binary or gray scale macroblock are considered non-active. System 10 locates non-active block regions from the closed regions of adjacent non-active blocks. The pixels in each non-active block region are then formatted with their background gray scale level stored in BKGD.

The gray scale values of the pixels in the gray scale macroblock are then formatted in the blocks for each gray scale macroblock using GS IMAGES. Gray scale macroblocks in GS IMAGES are stored in an order which corresponds to the order of their position data in GSCOORD. This provide facilitates formatting pixels of GS IMAGES in the proper gray scale macroblock. If during formatting of the pixels of the gray scale macroblocks, a conflict occurs with a pixel previously formatted, the lower of the values in conflict is used in formatting the pixel. No conflict is present if both the value of the previous formatted pixel, and the pixel being formatted are the same. Conflicts can occur in the case of non-rectangular gray scale macroblocks which were appended with additional pixels to provide a rectangular shaped region (see FIG. 2(c)). These appended pixels were set to the highest gray scale value, such that when a conflict occurs their values are not used in the formatting process.

Finally, the image data representing OUTPUT DOCUMENT is outputted by system 10 to printer 25. This OUTPUT DOCUMENT is representative of the scanned document which originally provided the PRIMITIVE DOCUMENT from which the received smart document had been generated. The OUTPUT DOCUMENT image data can also be transmitted via data link 15 to remote printers or other imaging systems.

In the preferred embodiment, printer 25 is a continuous tone printer. This allows printer 25 to print the image data representing OUTPUT DOCUMENT since this data is in the form of a two-dimensional array of pixels having gray scale values. System 10 however may be modified to operate with other types of non-continuous tone printers, such as binary or halftone printers. For example, if printer 25 is a binary or halftone printer, gray scale value information need no longer be maintained since only two colors can be printed (black and white). This simplifies system 10 operation since majority and minority gray scale levels (BGLS) are no longer needed. Also, encoding of gray scale macroblocks may be performed by other techniques than JPEG to even further increase data compression. Gray scale macroblocks in binary printers can be encoded by ToneFac, while in a halftone printer they can be halftoned by standard techniques, such as error diffusion.

The data compression provided by system 10 is illustrated by the example of a PRIMITIVE DOCUMENT with 8 bit gray scale image of 1600×1048 pixels having 40% gray scale images and 60% text and background. The ratio of data compression by encoding the entire document using JPEG techniques to the data compression of the document as a smart document is 1:00:1.75. This ratio may further improve if this document contained lesser amounts of gray scale images, or greater numbers of non-active blocks after macroblock generation. This data compression is achieved without degrading the quality of the document reproduced from data representing the smart document because, as shown above, all the data or information necessary for reproduction is efficiently stored in the smart document.

A further embodiment of the present invention provides real time processing of primitive documents into smart documents with minimal memory requirements. Real time processing may be required when only a limited number of lines of the image data in PRIMITIVE DOCUMENT can be stored in memory 14. Further, real time processing can minimize delays by beginning the generation of smart documents while scanner 24 continues to scan the document and producing of PRIMITIVE DOCUMENT image data. To achieve real time processing, smart document generation described above is modified by scanning the document to provide a predefined number of lines of image data of PRIMITIVE DOCUMENT into memory 14, and operating on the stored lines in successive sections which overlap each other. The first section includes the first scanned M+N lines of PRIMITIVE DOCUMENT, where M and N are multiples of eight, and N is less than M. The first section is then segmented and classified. The results of the last N lines of the first section are discarded, and a smart document is generated from the first M line. This first part of the smart document may be outputted from system 10.

The next section includes the next scanned M+N lines of PRIMITIVE DOCUMENT, and the last N lines of the processed lines of the first section, providing a total of M+2N lines. This section is then segmented and classified, the first N and last N lines are discarded, and the resulting M lines are processed into a smart document. This second part of the smart document may then be outputted. The above repeats until the whole document page is scanned by scanner 24, and an entire smart document has been generated. Note that the final section will overlap the prior section by N lines, and will contain any lines left unprocessed. The inclusion of some areas whose segmentation results are later discarded is to provide an overlap region of lines to avoid misclassification of some image regions at the upper and lower margins of each set of M lines processed. Operation of system 10 for receiving a smart document in real-time processing would also be modified, such that system 10 produces image data for OUTPUT DOCUMENT to printer 25 according to each received part of the smart document.

Table I below shows an example of real time processing of a PRIMITIVE DOCUMENT with 1052 lines, where M=200, N=16, and lines are numbered 0 to 1051. At each step, the range of segmented and classified lines of the PRIMITIVE DOCUMENT are listed in Table I with the lines within that range which are processed into a smart document.

TABLE I

| Step | Segment & Classify Lines (line numbers) | Process into Smart Document Lines (line numbers) |
| --- | --- | --- |
| 1 | 0–215 | 0–199 |
| 2 | 184–415 | 200–399 |
| 3 | 384–615 | 400–599 |
| 4 | 584–815 | 600–799 |
| 5 | 784–1015 | 800–999 |
| 6 | 984–1051 | 1000–1051 |

Generated smart documents (FIG. 2(a–d)) also provide an efficient means of storing documents in compressed data formats, which may be decompressed (see FIG. 7) as needed. For example, FIG. 1 may be modified by coupling a non-volatile storage unit such as a hard disk drive or a networked data base system (not shown in FIG. 1) to bus 13. Smart documents may then be stored on the non-volatile storage unit.

Smart documents also provide an image data format which allows processing of image data according to common image types. For instance, the text in binary segments can be further processed by OCR techniques for identifying works, classifying content, or conversion into ASCII representations. The BINARY IMAGE file in the smart document identifies such text information. Also, image editing techniques can be selectively applied to gray scale segments, such as scaling, rotating, copying, and highlighting. GSCOORD in the smart document may be used to locate the desired gray scale segment, while GS IMAGES may be accessed to obtain the pixel values of that segment.

Smart documents can readily be converted into other representations for particular printing techniques which may be available on printer 25. For example, the smart document may be converted into a page description language, such as PostScript, which operates on text, graphics, and bit-mapped images differently. Binary and gray scale segments are each described using PostScript operators. Preparation of PostScript pages is further described in Adobe Systems Inc., PostScript Language: Tutorial and Cookbook, Eddison-Wesley, (1987).

In a further embodiment of system 10, gray scale macroblocks may be further classified as low resolution halftone and continuous tone image types after macroblock classification in FIG. 2(a). This can be achieved through known auto-correlation techniques for identifying halftone image types. Continuous tone and low resolution halftone macroblocks are processed into a smart document in the same manner as gray scale macroblocks. However, identified halftone macroblocks may then be re-halftoned by printer 25 before printing of OUTPUT DOCUMENT, when printer 25 is halftone type printer.

In another embodiment, binary macroblocks may be further classified as non-text and text image types. An example of technique for determining text from non-text is described in Wahl et al. at pages 387–390. Non-text image types refer to graphics or high resolution halftone image types. As already stated, auto-correlation techniques may be used to identify halftone images. High resolution halftone macroblocks may then be compressed by other techniques in binary encoder/decoder 18 to further improve data compression of the smart document, such as described in S. Forchhammer and M. Forchhammer, Algorithm For Coding Scanning Halftone Images (1988).

Additionally, system 10 may also operate upon color documents when using the above described components with color data handling capability. First, scanner 24 then is a color scanner which scans a document into red, green, and blue color channels (RGB), resulting in a PRIMITIVE DOCUMENT having an array of pixels each with a R, G, and B color channel value. The R, G, and B color channels of the pixels are then transformed into the color channels referred to as Luminance, X1 and X2, where:

Luminance=⅓(R+G+B)

X1=½(R−B)

X2=¼(2G−R−B)

The Luminance, X1 and X2 channel are orthogonal to each other. After the pixels are transformed, a median filter is applied to the pixels' Luminance channel to reduce or suppress noise due to any halftone color patterns in the scanned document. A median filter, for example, operates as follows: For each pixel in the PRIMTIVE DOCUMENT the pixel is centered within a group of ExQ pixels (preferably having 3×3 pixels). The median of the Luminance channel values for the pixels in the group is calculated. This median value is temporarily stored in memory in correspondence with the center pixel. During the filter operation, if a pixel of PRIMITIVE DOCUMENT no longer will be included in any more ExQ groups, then the stored median value corresponding to the pixel replaces the pixel's original Luminance channel value. The PRIMITIVE DOCUMENT is then processed, as described above, using the pixels' filtered Luminance channel values to perform activity classification and macroblock generation, as shown in FIG. 2(a).

The determination of non-active block region background levels in FIG. 5 is modified such that a histogram of the pixels in each region is generated in each of the Luminance, X1 and X2 channels. Then, the peak value in each histogram is determined. These three peak values represent the background level data for the region.

After macroblock generation, the binary macroblocks are processed. In FIG. 2(b), after MAP is generated, the pixels of the binary macroblocks are binarized using their Luminance channel values. Next, in addition to determining the majority and minority levels of the Luminance channel of each binary macroblock, the majority and minority levels are found for the pixels of each macroblock in their X1 and X2 channels. This is performed by creating a histogram of these channels and determining the greatest two modes representative of the bimodal nature of the histograms. For each macroblock, the three pairs of majority and minority levels determined are stored in BGLS. Gray scale macroblocks are processed in the same manner as described above and as shown in FIG. 2(b), except gray scale macroblocks pixels are represented by their Luminance, X1 and X2 channels. JPEG entropy encoder/decoder 20 may operate upon the Luminance, X1 and X2 channels in producing GS IMAGES$_E$. A smart document can thus be generated for color documents.

Operation of system 10 for receiving a smart document having data representing a color document is the same as shown in FIG. 7, except pixels of OUTPUT DOCUMENT are formatted in their Luminance, X1 and X2 channel values, and prior to printing OUTPUT DOCUMENT its pixels are inverse transformed from Luminance, X1 and X2 channels into R, G and B channel values.

From the foregoing description, it will be apparent that there has been provided an improved system for segmenting a document, and generating a compressed smart document. Variations and modifications in the herein described system, in accordance with the invention, will undoubtedly suggest themselves to those skilled in the art. Accordingly, the foregoing description should be taken as illustrative and not in a limiting sense.

What is claimed is:

1. A system for producing a compressed document from a document page composed of an array of pixel signals having values representative of gray scale comprising:

means for subdividing said pixel signals of said document page into a matrix of blocks;

means responsive to values of the pixel signals in the blocks for segmenting the document page into one or more macroblocks, each said macroblock being composed of a group of one or more of said blocks which are adjacent to each other in said matrix;

means for locating one or more regions of one or more said blocks which are adjacent to each other in said matrix and are not part of said macroblocks, and determining the prevalent value of the pixel signals of said blocks in each said region to provide background data;

means for classifying each of said macroblocks as being either one of two image types by analyzing for areas within one or more blocks of the macroblock having pixel signals which transition outside a range from each of two pixel values most prevalent among the pixel signals of the macroblock which are sufficiently different from each other;

means for producing a map representing the blocks in said matrix which are of a first of said two macroblock types;

means for thresholding the pixel signals in the blocks represented in said map into binary representations thereof to provide a binary image;

means responsive to said pixel signals in said array for obtaining data signals representing the majority and minority gray scale levels of each macroblock which are of said first type;

means for generating position data specifying the locations of the macroblocks in said matrix which are of a second of said two macroblock types; and means for generating said compressed document from said map, said binary image, said data signals representing said levels, the pixel signals for the macroblocks of said second type, said background data, and said position data.

2. The system according to claim 1 further comprising:

means for encoding said map and said binary image to provide data representing said encoded map and encoded binary image;

means for encoding the pixel signals in the said second type macroblocks to provide encoded macroblocks of said second type; and said generating means being operative to generate said compressed document from said encoded map, said encoded binary image, and said encoded second type macroblocks.

3. The system according to claim 2 further comprising:

means for storing said array of pixel signals, said encoded map, said encoded binary image, said encoded second type macroblocks, said background data, said position data and said data signals representing levels; and said generating means further comprises means for accessing said storing mean to provide a digital data representation of said document page.

4. The system according to claim 1 further comprises:

means for transmitting said compressed document; and means for receiving said compressed document, and producing an output page in accordance with said received compressed document which is representative of said document page.

5. The system according to claim 1 wherein said segmenting means further comprises:

means for classifying each said block as one of active and non-active;

means for reclassifying one or more non-active blocks as active in accordance with the activity classifications of blocks adjacent to each non-active block; and means for generating said macroblocks by grouping one or more of said active blocks which are adjacent to each other in said matrix.

6. The system according to claim 5 wherein said locating and determining means further comprises means for locating regions of one or more said non-active blocks which are adjacent to each other in said matrix.

7. The system according to claim 1 wherein said first type of macroblock is a binary image type, and said second type of macroblocks is a gray scale image type.

8. The system according to claim 1 further comprising means for classifying said second type macroblocks as one of third and fourth types.

9. The system according to claim 8 wherein said third type is a halftone image type, and said fourth type is a continuous tone image type.

10. The system according to claim 1 wherein said document page is composed of an array of pixel signals having values representative of a plurality of color channels, and wherein said gray scale values of said pixel signals contain a first of said color channels, said system further comprising:

means for applying a median filter to said values of said pixel signals in said first color channel;

said locating and determining means further comprising means for locating one or more regions of blocks which are adjacent to each other in said matrix and are not part of said macroblocks, and determining the prevalent value of the pixel signals of said blocks in each said region in said color channels to provide background data; and said means for obtaining data signals further comprises means for obtaining data signals representing majority and minority levels of said pixel signals for each macroblock of said first type in each said color channel.

11. The system according to claim 10 wherein said array corresponding to said document page represents a first array of pixel signals corresponding to said first color channel and second and third color channels, and wherein said document page is produced from a scanned document composed of a second array of pixel signals having values in red, green, and blue color channels, said system further comprising means for transforming said pixel signals in said first array from said red (R), green (G) and blue (B) color channels into said first, second and third color channels of said second array, wherein said first color channel equals $\frac{1}{3}(R+G+B)$, said second color channel equals $\frac{1}{2}(R-B)$, and said third channel equals $\frac{1}{4}(2G-R-B)$.

12. A system for automatic segmentation of a scanned document into separate document areas containing different types of image information which can vary in gray scale value comprising:

means for scanning the document to generate a scanned image thereof;

means for subdividing the scanned image into a matrix of blocks;

means for analyzing the information contained in each block to classify said blocks as active or non-active, therein providing an activity classification of said blocks;

means for generating macroblocks by grouping one or more adjacent said blocks in said matrix in accordance with their activity classification thereby segmenting said document; and means for analyzing the information contained in the blocks composing the macroblocks to classify each said macroblock as one of two image types in which when any of said macroblocks have at least one area within one or more blocks of the macroblock that has information which transitions outside a range from each of two gray scale values representative of the macroblock, the macroblock is a second of said two image types, and when said macroblock lacks at least one said area, said macroblock is a first of said two image types.

13. The system according to claim 12 further comprising:

means for analyzing the information contained in the blocks of the macroblocks of one of said image types as one of third and fourth image types.

14. The system according to claim 13 wherein said third type is a halftone image type, and said fourth type is a continuous tone image type.

15. The system according to claim 13 wherein said third type is text, and said fourth type is non-text or graphics.

16. The system according to claim 12 wherein a first and second one of said macroblock types are binary image and gray scale image types, respectively.

17. The system according to claim 12 wherein said scanning means generates said scanned image representing information characterized by a plurality of color channels, said system further comprising means for transforming said information of said scanned image from said plurality of color channels into a different color channel.

18. The system according to claim 12 further comprising means for reclassifying one or more non-active blocks as active.

19. The system according to claim 12 further comprising:
means for changing the classification of one of the non-active blocks to active when at least three active blocks are non-diagonally neighboring said one non-active block in said matrix, and when two active blocks diagonal to each other in said matrix are non-diagonally neighboring said one non-active block in said matrix, with a non-active block diagonally neighboring said one non-active block in said matrix without being a neighbor to said two active blocks which are diagonal to each other; and
means for operating said changing means during successive scans of the blocks in said matrix until no non-active blocks are changed during one of said successive scans.

20. A method for producing a compressed document from a scanned document in a document processing device in which said scanned document has one or more different types of image information which can vary in gray scale value, said method comprising the steps of:
subdividing the scanned document into a matrix of blocks;
segmenting the scanned document into at least one group of one or more of said blocks which are adjacent to each other in said matrix in accordance with the image information of said scanned document to provide one or more macroblocks;
locating one or more regions of one or more said blocks which are adjacent to each other in said matrix and are not part of said macroblocks;
determining a level for each region corresponding to a numerical characteristic of the information in said region;
analyzing the information in the blocks of said macroblocks to classify each macroblock as first or second types in which when any of said macroblocks have at least one area within one or more blocks of the macroblock that has information which transitions outside a range from each of prevalent two gray scale values of the macroblock, which are sufficiently different from each other, the macroblock is a second type macroblock, and when said macroblocks lacks at least one said area, the macroblock is a first type macroblock;
producing a map representing the blocks in said matrix of said first type macroblocks;
generating a binary image of the information in the blocks represented in said map;
determining two levels for each said first type macroblock corresponding to the numerical characteristic of the information therein;
determining position data specifying the locations of the macroblocks of said second type in said matrix; and
generating said compressed document comprising said binary image, the information in said second type macroblocks, said position data, said map, said level of each region, and said levels of said first type macroblocks.

21. The method according to claim 20 further comprising the steps of:
encoding said map and said binary image;
encoding the information in said second type macroblocks; and
wherein said map, said binary image, and the information in said second type macroblocks in said compressed document represent said encoded map, said encoded binary image, and said encoded second type macroblocks, respectively.

22. The method according to claim 20 wherein said segmenting step further comprises the steps of:
classifying said blocks as active or non-active based upon the amount of information in the blocks;
reclassifying one or more non-active blocks as active depending on the activity classification of the blocks adjacent to non-active blocks; and
generating said macroblocks by grouping one or more of said active blocks which are adjacent to each other.

23. The method according to claim 22 wherein said locating step further comprises the step of locating regions of one or more said non-active blocks which are adjacent to each other.

24. The method according to claim 22 wherein an array of pixel signals having values representative of gray scale represents the information of said scanned document, said step of classifying said blocks as active or non-active further comprises the steps of:
determining the DCT coefficients ZZ(k) and quantization table elements Q(k) representing the pixel signals in said block, where k equals from 0 to 63;
determining the Activity of each said block, wherein $$Activity = \sum_{k=1}^{63} \left| NINT\left(\frac{ZZ(k)}{Q(k)}\right) \right|; \text{ and}$$

classifying said blocks as active when their Activity is greater than a threshold, and said block as non-active when their Activity is not greater than said threshold.

25. The method according to claim 20 further comprises the steps of:
transmitting said compressed document from said document processing device to a document receiving device;
receiving said compressed document by said document receiving device; and
producing an output document by said document receiving device, in accordance with said received compressed document, which is representative of said scanned document.

26. The method according to claim 20 wherein said first type of macroblock is a binary image type, and said second type of macroblocks is a gray scale image type.

27. The method according to claim 20 further comprising the step of classifying said second type macroblocks as third and fourth types.

28. The method according to claim 27 wherein said third type is a halftone image type, and said fourth type is a continuous tone image type.

29. The method according to claim 20 wherein an array of pixel signals represents the information of said scanned document, said analyzing step further comprising the steps of:

producing a histogram of the values of the pixel signals in each said macroblock;

determining the highest two peak pixel signal values of said histogram which are sufficiently separated from each other;

determining the macroblock as gray scale type when there is at least one U×V group of adjacent pixel signals in the blocks of the macroblock, wherein each pixel signal has an absolute difference of their value from a first of said peak values which is greater than a threshold, and an absolute difference of their value from a second of said peak values which is greater than said threshold; and determining the macroblock as binary type when there is no U×V group of adjacent pixel signals in the blocks of the macroblock each have of an absolute difference of their value from said first of said peak values which is greater than said threshold, and an absolute difference of their value from said second of said peak value which is greater than said threshold.

30. The method according to claim 20 wherein said scanned document represents information characterized by a plurality of color channels, said method further comprising the steps of:

filtering a first of said color channels to reduce halftone image information in said scanned document;

wherein said segmenting step, said locating step, said analyzing step, said producing step, and said generating step operate in accordance with said first color channel;

wherein said step of determining a level for each region further comprises the step of determining a level for each region in each color channel which is numerically characteristic of the information in said region; and wherein said step of determining two levels for said first type of macroblock further comprises the step of determining two levels for each said first type macroblock for each said color channel which are numerically characteristic of the information of said first type macroblock.

31. The method according to claim 20 wherein said scanned document is composed of information characterized by red, green and blue color channels, said method further comprising the steps of:

transforming said information of said scanned document from said red (R), green (G) and blue (B) color channels into first, second and third color channels, wherein said first color channel equals ⅓(R+G+B), said second color channel equals ½(R−B), and said third channel equals ¼(2G−R−B);

filtering said first color channel to reduce halftone image information in said scanned document;

wherein said segmenting step, said locating step, said analyzing step, said producing step, and said generating step operate in accordance with said first color channel;

wherein said step of determining a level for each region further comprises the step of determining a level for each region in each color channel which is a numerically characteristic of the information in said region; and wherein said step of determining two levels for said first type of macroblock further comprises the step of determining two levels for each said first type macroblock for each said color channel which are numerically characteristic of the information in said first type macroblock.

32. A method for automatic segmentation of a scanned document in a document processing device to separate document areas containing different types of image information comprising the steps of:

scanning the document to generate a scanned image thereof;

subdividing the scanned image into a matrix of blocks;

analyzing the information contained in each block to classify said blocks as active or non-active, therein providing an activity classification of said blocks;

generating macroblocks by grouping one or more adjacent said blocks in said matrix in accordance with their activity classification; and analyzing the information contained in the blocks composing the macroblocks to classify each said macroblock as one of two image types in which when any of said macroblocks have at least one area within one or more blocks of the macroblock that has information which transitions outside a range from each two gray scale values representative of the macroblock, the macroblock is a second of said two image types, and when said macroblock lacks at least one said area, said macroblock is a first of said two image types.

33. The method according to claim 32 wherein said step of analyzing the information contained in each said block to classify said blocks further comprises the step of classifying said blocks as active or non-active based upon the amount of information in the blocks.

34. The method according to claim 33 further comprising the step of reclassifying one or more non-active blocks as active depending on the activity classification of the blocks adjacent to non-active blocks, and said generating macroblocks step further comprises the step of generating said macroblocks by grouping one or more said active blocks which are adjacent to each other.

35. The method according to claim 32 further comprising the step of classifying macroblocks of one of said types as third or fourth image types.

36. The method according to claim 35 wherein said third type is a halftone image type, and said fourth type is a continuous tone image type.

37. The method according to claim 32 wherein a first one of said types of macroblocks is a binary image type, and a second one of said types of macroblocks is a gray scale image type.

38. The method according to claim 32 wherein said third type is a text information, and said fourth type is non-text information.

39. The method according to claim 32 wherein an array of pixel signals having values representative of gray scale represents the information of said scanned document, and said step of analyzing information to classify said blocks as active or non-active further comprises the steps of:

determining the DCT coefficients ZZ(k) and quantization table elements Q(k) representing the pixel signals in said block, where k equals from 0 to 63;

determining the Activity of each said block, wherein $$Activity = \sum_{k=1}^{63} \left| NINT\left(\frac{ZZ(k)}{Q(k)}\right) \right|; \text{ and}$$

classifying said blocks as active when their Activity is greater than a threshold, and said block as non-active when their Activity is not greater than said threshold.

40. The method according to claim 32 wherein said step of analyzing information to classify each said macroblock further comprises the steps of:
producing a histogram of the values of the pixel signals in each said macroblock;
determining the highest two peak pixel signal values of said histogram which are sufficiently separated from each other;
determining the macroblock as gray scale type when there is at least one U×V group of adjacent pixel signals in the blocks of the macroblock, wherein each pixel signal has an absolute difference of their value from a first of said peak values which is greater than a threshold, and an absolute difference of their value from a second of said peak values which is greater than said threshold; and
determining the macroblock as binary type when there is no U×V group of adjacent pixel signals in the blocks of the macroblock each have of an absolute difference of their value from said first of said peak values which is greater than said threshold, and an absolute difference of their value from said second of said peak value which is greater than said threshold.

41. The method according to claim 32 wherein said scanned image represents information characterized by a plurality of color channels, said method further comprises the step of transforming said information of said scanned image from said plurality of color channels into a single color channel.

42. The method according to claim 32 further comprising the steps of:
changing the classification of one of the non-active blocks to active when at least three active blocks are non-diagonally neighboring said one non-active block in said matrix, and when two active blocks diagonal to each other in said matrix are non-diagonally neighboring said one non-active block in said matrix, with a non-active block diagonally neighboring said one non-active block in said matrix without being a neighbor to said two active blocks which are diagonal to each other; and
successively scanning the blocks of said matrix until no non-active blocks are changed during one of said successive scans.

43. A system for producing a smart document from a primitive document which can have different types of image information comprising:
means for analyzing the information contained in regions of said primitive document to classify said regions as active or non-active, therein providing an activity classification of said regions;
means for generating segments by grouping one or more adjacent said regions responsive to their activity classification;
means for analyzing the information contained in the regions composing the segments to classic each segment as one of binarizable or non-binarizable types by determining the presence of areas of image transition within the information of the segment by determining the absence or presence, respectively, of one or more areas of image transition within the information of the segment in accordance with said areas having information being outside one or more ranges of at least two different gray scale values characterizing the information of the segment;
means for compressing each segment in accordance with their type; and
means for outputting information about said compressed regions with sufficient format information about said primitive document to provide said smart document.

44. The system according to claim 43 wherein said primitive document represents information characterized by a plurality of color channels, said system further comprising means for filtering a first of said color channels to reduce halftone image information in said primitive document, and wherein said analyzing means, generating means, and analyzing means operate in accordance with said first color channel.

* * * * *